US011650090B2

(12) United States Patent
Ragot Chopard et al.

(10) Patent No.: US 11,650,090 B2
(45) Date of Patent: May 16, 2023

(54) FLOW RATE ESTIMATION OF A FLUENT SOLID MATERIAL IN A GENERALLY HORIZONTAL PIPE

(71) Applicant: Feed Flow Limited, Winnipeg (CA)

(72) Inventors: Marcelin Ragot Chopard, Winnipeg (CA); Casey Mitchell Forsyth, Winnipeg (CA)

(73) Assignee: Feed Flow Limited, Winnipeg (CA)

( * ) Notice: Subject to any disclaimer, the term of this patent is extended or adjusted under 35 U.S.C. 154(b) by 171 days.

(21) Appl. No.: 17/185,050

(22) Filed: Feb. 25, 2021

(65) Prior Publication Data
US 2021/0262845 A1 Aug. 26, 2021

Related U.S. Application Data

(60) Provisional application No. 62/981,836, filed on Feb. 26, 2020.

(51) Int. Cl.
| | | |
|---|---|---|
| *G01F 1/7082* | (2022.01) | |
| *G01F 1/7086* | (2022.01) | |
| *F17D 3/18* | (2006.01) | |
| *G01F 23/296* | (2022.01) | |
| *A01K 61/80* | (2017.01) | |
| *G01F 23/2962* | (2022.01) | |

(52) U.S. Cl.
CPC ............ *G01F 1/7086* (2013.01); *F17D 3/18* (2013.01); *G01F 1/7082* (2013.01); *A01K 61/80* (2017.01); *G01F 23/2962* (2013.01)

(58) Field of Classification Search
CPC . F17D 3/18; G01F 25/00; G01F 25/10; G01F 25/11; G01F 25/12; G01F 25/13; G01F 25/14
See application file for complete search history.

(56) References Cited

U.S. PATENT DOCUMENTS

| | | | | |
|---|---|---|---|---|
| 4,203,535 | A * | 5/1980 | Burnett | ............... B65G 69/185 |
| | | | | 222/459 |
| 4,749,273 | A * | 6/1988 | Reinhold | ............... G01F 1/661 |
| | | | | 356/627 |
| 2015/0377690 | A1 * | 12/2015 | Phelan | .................... G01F 25/10 |
| | | | | 73/1.34 |
| 2021/0105941 | A1 * | 4/2021 | Yu | .......................... G01S 13/87 |

FOREIGN PATENT DOCUMENTS

CN 101704446 A * 5/2010 ............. B65G 15/36

* cited by examiner

*Primary Examiner* — Herbert K Roberts
(74) *Attorney, Agent, or Firm* — Adrian D. Battison; Ade & Company Inc.; Kyle R. Satterthwaite

(57) ABSTRACT

Apparatus is provided for estimating a flow rate of a fluent solid material in a generally horizontal pipe having a movable transportation element such as an auger in the pipe for transporting the material along the pipe including distance sensors mounted in the pipe in an upper part of the pipe and arranged to detect the distance of the material in a lower part of the pipe from the sensor. Another sensor is provided to detect the rate of movement of the transportation element for example by detecting the metal of the auger flight. The output from the sensors is fed to a control system for analyzing the output signals from the sensors over time to provide the estimate of flow rate. The sensors can be mounted in a pressurized enclosure to prevent escape of dust though openings for the sensors.

30 Claims, 22 Drawing Sheets

FLOW RATE ESTIMATION OF A FLUENT SOLID MATERIAL IN A GENERALLY HORIZONTAL PIPE

This application claims the benefit Under 35 USC 119 (e) of Provisional Application 62/981,836 filed February 26 2020 the disclosure of which is incorporated herein by reference.

This application relates to a method for indirect measuring of the flow rate of fluent materials in non-vertical conduits.

BACKGROUND OF THE INVENTION

Feed is by far the most significant expense in intensive livestock production, often accounting for 60% to 70% of total production costs. However, in modern commercial livestock production, feed remains one of the most unmeasured items in the entire process. This creates substantial inefficiencies throughout different areas of the production process. For example, absence of such data for feed inventory management often leads to feed outages, costly emergency deliveries, leftover feed at closeout, non-uniform feed delivery schedules, and other challenges. Availability of highly accurate, near real time data on feed usage, as opposed to the current norm of using months-old feed usage data that only becomes available after completion of the growth cycle, is essential for implementation of proactive adjustments to feeding plans, environment, and other key production inputs. Enhanced animal performance analysis and planning, quicker identification of animal health issues, and application of micronutrients (e.g. enzymes, probiotics, antioxidants, etc.) on the farms instead of at the feed mills are just a few other areas that would also directly benefit from greater availability of highly accurate and close to real time feed usage data.

Current approaches for monitoring feed consumption are largely based on experience, historical data and approximation using information from historical feed orders and knowledge of animal inventory in a given barn. Another common approach is based on monitoring the feed disappearance in the bin through the use of costly load cells.

Therefore, there is need for a low-cost solution that can measure, in close to real time, the flow rate of fluent solid materials with a high degree of accuracy, particularly in settings common for the commercial livestock industry.

SUMMARY OF THE INVENTION

According to the invention there is provided an apparatus for estimating a flow rate of a fluent solid material in a generally horizontal pipe having a movable transportation element in the pipe for transporting the material along the pipe, the apparatus comprising:

a plurality of distance sensors mounted in an upper part of the pipe and arranged to detect the distance of the material in a lower part of the pipe from the sensor;

and a control system for analyzing the output signals from the sensors over time to provide the estimate of flow rate.

The arrangement disclosed herein can determine the fluent solid materials' flow rate in a pipe using range detection sensors. The sensor which detects the distance of the material from the sensor is placed on the top of the pipe and directed at the inside bottom of the pipe. Reading values from a range detection sensor gives an estimation of the speed of the fluent solid material moving inside the pipe when detecting a movable element (e.g. an auger or disc) below the sensor; otherwise, the read values are derived from the height of feed in the pipe.

Optionally there is provided a sensor arrangement which detects the rate of movement of a feeding system that uses a moving element in the pipe. This can be done with better accuracy using a specific or separate sensor which reacts to the moving element. This can be achieved preferably through use of a metal detection sensor for a metallic auger. However other systems can use a rotation/motion sensor attached to the shaft of the engine, an accelerometer, etc. Using an array of sensors gives more accurate readings, reducing the Signal-To-Noise-Ratio (SNR) and revealing the outlier values. The sensors are driven by a microcontroller. Several algorithms, used on the data coming from the sensors, output the amount of fluent solid material passing through the pipe at regular time intervals.

The method/process to acquire the data and determine the fluent solid's flow rate in the pipe incudes the following steps:

The distance/range sensors continuously acquire data.
Optionally a dedicated sensor detects the speed of the conveyor element.
Data is extracted from the sensors. The extracted data is labelled as raw and has already been preprocessed by a specific data extraction algorithm.
Calibration data is used for the extraction.
The raw data is placed into a memory buffer.
The data is processed by the flow rate determination algorithms in the memory buffer.
Configuration data is used to refine results from the flow rate algorithms.

The described flow rate prediction methods, each independently and in a combination, can be applied as follows:

Fluent solid materials can be measured, where fluent materials are described as dry, solid particulate materials or powders which are capable of flowing. Examples of such flowable materials may include, but are not limited to animal feed, grain, seeds, plastic pellets, dry cement, flour and the like.

The arrangement described herein was developed with a particular application in mind, namely for feed flow rate measurement in the pipe of an automated livestock feeding system, for feed types in the form of pellets and mash. However, other materials can be measured using the systems herein and particle size will not affect applicability of the arrangement described herein. If the arrangement is applied for very small granules, some adjustments may be required, in particular on the Machine Learning (ML) algorithms and potentially for the dust repellent component of the arrangement described herein.

The fluent solid materials' flow rate can be expressed in Liters·second$^{-1}$ (Liters·s$^{-1}$) or in Kilograms·second$^{-1}$ (Kg·s$^{-1}$). The processor is configured to calculate the weight and/or volume of the fluent solid material from the velocity and the volume of fluent material in the pipe. The volume of the fluent material is calculated in liters and may be converted to weight (kilograms [kg]) using the density of the material. The processor may also adjust the volume of fluent material (e.g., by adjusting the density and the viscosity of the fluid) for any variation of the measured temperature/humidity of the fluent material from a normalized or reference value. Mass and weight of the measured materials are used interchangeably in the document and are linked to the density.

The arrangement herein can be used in any non-vertical closed conduit, where the fluent material is moving by means other than gravity and is not applicable for free falling materials in vertical applications.

The arrangement herein can be used where animal feed is moved by a conveyor but is not limited to a typical conveyor conventionally used within the automated animal feeding systems for commercial livestock production. Such feed systems commonly have a conveyor element moveable within a feed conduit for conveying feed, and a plurality of drop feeders spaced at intervals along the path of the feed conduit. Commonly, the feed conduit is in the form of a closed, not transparent flexible feed tube (e.g. from polyvinyl chloride (PVC)). The moveable conveyor element housed in the feed conduit is typically a centreless helical auger, which may either be rotary driven or axially driven to transport the feed through the tube in one direction by means of an electrical motor having an output shaft.

The system will work with pipes and movable mechanical elements made of any material, as well in in applications when the fluent materials are moved by pressure. Some adjustments on the software algorithms, in particular for the range detection sensors, will be required to address these variations, however, the overall concept remains applicable.

Further described in this document, optional and preferred embodiment refers to the application for feed flow measurement in pipes of automatic animal feeding systems.

The sensors are mounted directly onto the pipe of a feeding system, preferably in the barn enclosure as suggested further in the description, in particular on the feed conduit at any number of desired locations. None of the elements are placed inside the feeding pipe.

The currently preferred implementation of the arrangement described herein, based on range detection sensors, typically requires a hole in the pipe of for each sensor but arrangements where the holes are omitted are possible. Currently the hole can be of the order of 1 inch in diameter, but this can be varied.

The sensors are positioned at the top of tube with the sensor facing down toward the fluent solid material moving in the tube. Each enclosure containing range detection sensors is positioned at a minimum distance of 100 mm from another such enclosure to avoid crosstalk between their enclosed sensors, as specified in the sensor's specification.

In a second arrangement, detection can be based on vibration sensors which replace the range sensors. Vibration sensors can be mounted on the outside of the tube and hence do not require any holes. The sensor is put in contact with the pipe, preferably in the enclosure as further described below.

BRIEF DESCRIPTION OF THE DRAWINGS

Embodiments of the invention will now be described in conjunction with the accompanying drawings in which.

DETAILED DESCRIPTION

Figure 1:
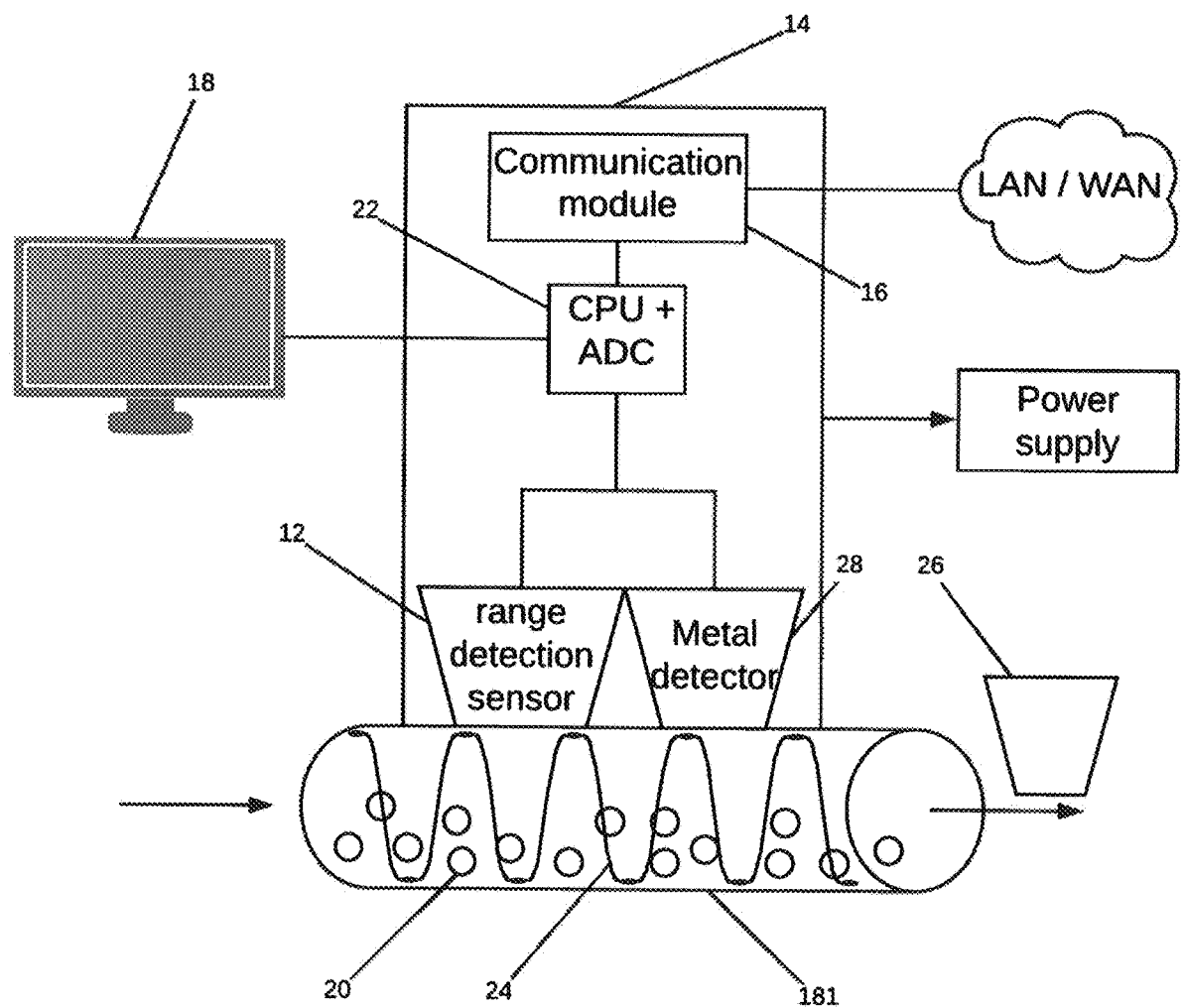
FIG. 1 is a schematic illustration of an overview of a first embodiment of method according to the present invention.

The disclosed arrangement described herein is comprised of the following components, as illustrated in FIG. 1.

The Embodiment 10 comprises a commercial distance/range sensor 12, preferably a short distance light-based sensor that uses Time of Flight methods to get an accurate measurement. This can be a commercial lidar sensor of this type. Other range detection sensors like ultrasonic sensors can be used but likely with a significant loss of accuracy due to their technological limitations. The sensors are mounted on a pipe 181 containing a flowable solid material 20 which is typically particulate such as animal feed and is fed through the pipe by a transfer member such as auger flighting 24. The pipe is generally horizontal, that is the pipe is sufficiently close to horizontal that the material slumps to the bottom surface 181 of the pipe rather than resting on the flighting.

Preferably there is provided a set of three sensors 12 for a sensor array, but the number can be varied.

The data Processing Module 22 can use a commercial Main Computer Board such as those built around ESP8266.

The array is mounted in an enclosure 14, characterized by a dust repelling device, for example, a commercial air blower which is used as described hereinafter.

Other optional implementations can include application of a dust-repellant glass sheet, mounting the distance range detection sensor on a vibrating plate, etc. The air blower can be replaced with another solution that is lower in power consumption and smaller in size.

The Communication Module 16 includes electronic components that allow for communication with other computers using well known communication protocols including, but not limited to WiFi, Bluetooth, Zigbee and Ethernet.

Figure 2:
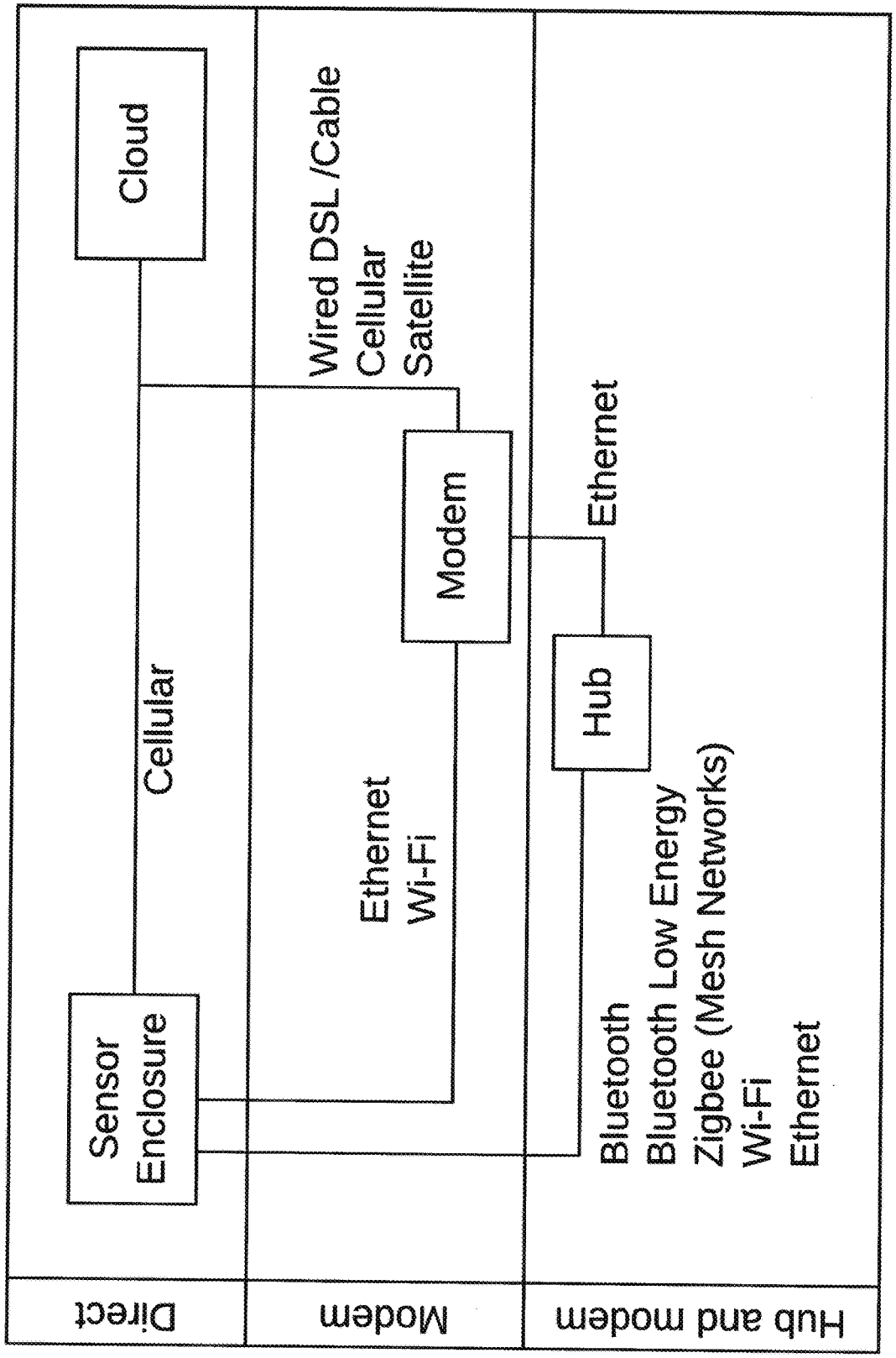
FIG. 2 is a schematic illustration of the data processing of the method of FIG. 1.
Figure 3:
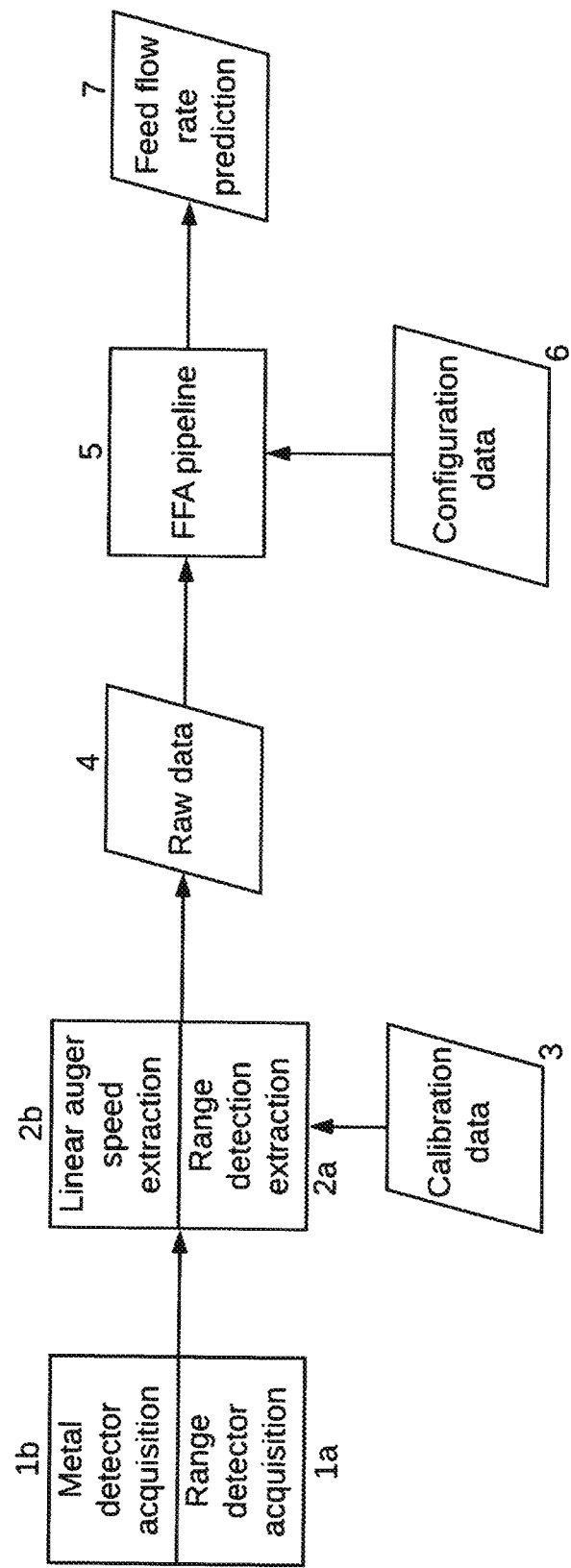
FIG. 3 is a schematic illustration of an overview of the flow rate prediction process of the method of FIG. 1.
Figure 4:
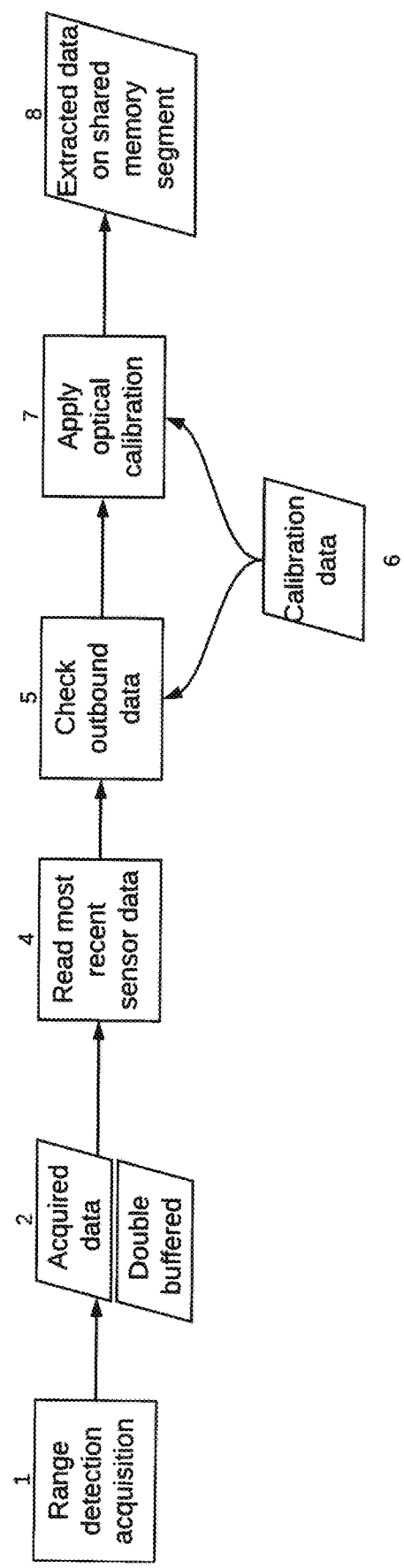
FIG. 4 is a schematic illustration of the range detection acquisition and extraction scheme of the method of FIG. 1.

Optional implementations for data processing used by the communication Module are illustrated in FIG. 2.

An external device can be provided with or without display for reporting/using the system's output. For example, a computer or an external system 18 which controls the feed dispensing, feed delivery system or the like.

An external storage device can be provided as an external peripheral or any commonly used commercial online storage systems.

Communication can be provided through standard industry communication devices and protocols.

Other sensors can be added to monitor the environmental parameters, including ambient humidity rate, temperature, pressure, light flow, etc. Data from these sensors is used to improve or refine the feed flow prediction or the readings of the distance range sensor and/or audio sensor array. Optionally, these sensors can be added into the main enclosure or in another enclosure, communicating through wireless channels. Data collected from these additional sensors is processed during the feed flow prediction process as described hereinafter on the flow rate estimation process in parallel with raw range and/or audio data.

A device 26 can be provided to evaluate the density, shape, and overall quality of the feed.

Sensors can be provided to measure composition of the material (i.e. density, flowability, stickiness, viscosity) to improve and/or automate the sensor configuration and improve flow rate predication accuracy.

The data Processing Module 22 on a custom hardware device (Main Computer Board, or MCB) can use a specifically made Processing Unit (CPU, MCU or the like) for the application, e.g. a Field Programmable Gate Array (FPGA) chip specifically programmed for the arrangement described herein and/or an ARM4xx or related MCU, commonly used in low profile devices. This implementation would result in lower electricity consumption, better CPU efficiency and overall cost reduction The method herein includes a number of steps as set out below. Step 1a and 1b (optional), 2a and 2b (optional), are run in parallel.

Step 1a: Range Detection Sensors Data Acquisition

The range detection sensor 12 measures the distance between a combination of optical components and a target in a specific direction. The sensors are mounted on a sensor enclosure, which allows for the acquisition of range detection data.

Preferably, the range detection sensors are calibrated to get the most precise data with the highest Signal-to-Noise Ratio (SNR) for the specific application of a range sensor enclosure. The calibration process is described hereinafter Step 1b: Metal Detection Acquisition This optional step provides a further sensor 28 which detects the movement of the auger inside the feeding pipe 181. The data acquired represents the distance between the metal detection sensor and the auger flighting 24. Over time, as the auger 24 revolves, the signal changes and can be described as a waveform.

Step 2a: Range Detection Data Extraction

The distance or range sensor is attached to a MCB using any communication protocol. An acquisition refresh rate is set in order to get enough data to filter the noise or any other artifact induced by the sensor's target or the sensor itself. The preferred acquisition refresh rate is 30 reads per second, per distance or range sensor. Optionally, each sensor is synchronized by an external clock in order to have the same refresh rate and timestamps.

The MCB is a very low-profile component. Its memory is very limited, and each new value coming from the sensor replaces the previous one, using a double-buffering method. The MCB performs a specific algorithm on the data acquired by the sensors before storing it to memory for the next steps. This data is referred to as raw data. The algorithm is described hereinafter.

The MCB's memory is limited, so the amount of raw data stored is defined according to this limitation. The allocated memory is shared between the processes in steps 1 and 2.

Step 2b: Linear Auger Speed Extraction

This optional step uses an algorithm that is able to use the waveform signal acquired from the metal detection sensor 28. This algorithm translates this waveform into a linear velocity, representing the speed the auger 24 applies to the feed in the pipe. Also, this linear velocity can be used to segment between situations in which the feeding system is turned on, when the auger is spinning, or turned off when the auger is not spinning.

Only the linear speed is kept after this process and it is attached to the data extracted in step 2a in order to minimize the amount of the MCB's memory that is used.

Step 3: Calibration Data

Calibration data is used to extract range data from the values acquired from the range detection sensor. The process of obtaining this data is further explained hereinafter in relation to calibration.

Step 4: Raw Data

The raw data is issued by the extraction and acquisition processes as described in Steps 1 and 2. This data represents the distance as sensed by the range detection sensor indexed by timestamp.

Since the MCB has a very limited amount of memory, this data is organized as a rotating buffer. There is a specific design for memory management and optimization implemented in the arrangement described herein. The memory manager can tell the process described in Step 5 if non-used data had been replaced by new data. The memory manager can change the priority of the processes accessing the raw data (i.e. Steps 2 and 5) in order to balance delay stability between data refreshes (Step 2) and feed flow algorithms data consumption (Step 5). The memory manager also uses feedback from Step 5 to free up memory by removing recently processed data.

To address MCB memory limitations, this memory segment can also contain intermediate values processed by Step 5. Although this data has technically been altered, it is still referred to as raw data.

Step 5: Flow Rate Algorithms

The Flow Rate Algorithms (FRA) consist of multiple algorithms. They are organized in a gluttonous pipeline. In the gluttonous pipeline, each deeper step does not have to wait until the step before it has finished processing the data chunk. Deeper steps can start to process data used by a less deep running step once data is marked as processed, whatever the state of the whole data chunk.

The FRA can manipulate the memory of the MCB allocated by the memory manager. It is guaranteed by the FRA process that the non-raw data it created takes the place of already used raw data. This non-raw data consists of temporary values used by the FRA pipeline. The FRA guarantees that the size of the temporary values does not exceed the size of the data it consumed to produce it. When the size of temporary values is less than the size of consumed data, the memory manager is made aware of available memory.

One FRA pipeline is needed per range detection sensor (optionally, one FRA pipeline is needed per range and speed detection sensor pair). The outputted value of each pipeline is passed to a global Kalman filter-style process. The Kalman filter is used to reduce the uncertainty of the processed values. Each FRA-pipeline outputted value is used as a truth observed value for another FRA-pipeline outputted value.

Figure 5:
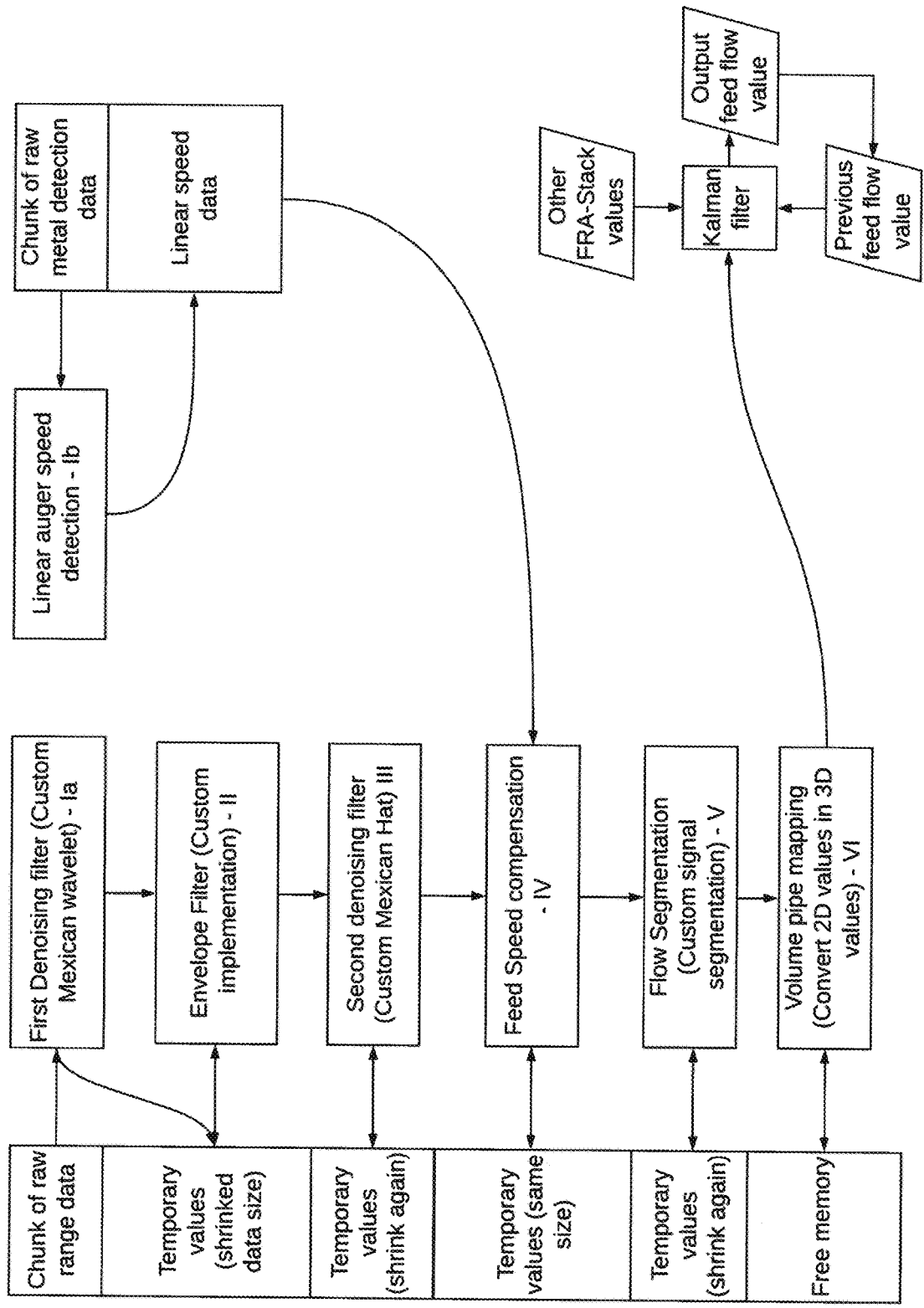
FIG. 5 is a schematic illustration of the flow rate algorithm pipeline of the method of FIG. 1.

An overview of the FRA is presented in FIG. 5 where an example of feed flow rate is used.

Figure 6:
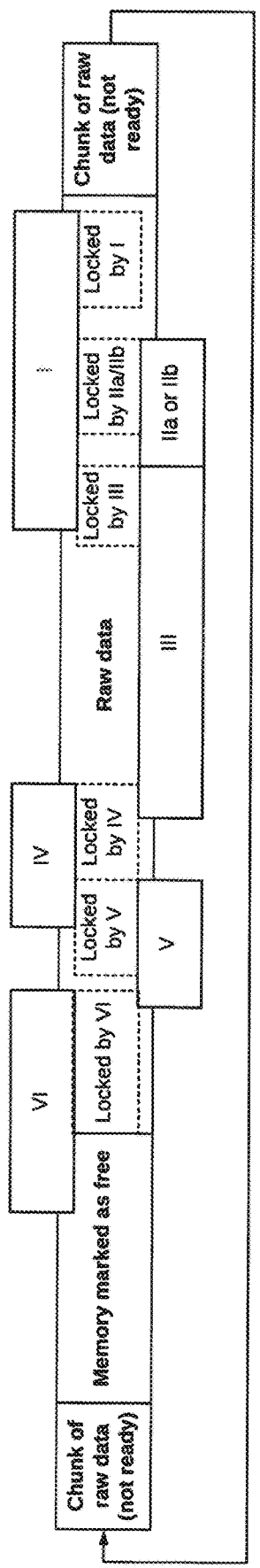
FIG. 6 is a schematic illustration of the process of FIG. 5 of rotating memory buffer update.

Each method indicated in brackets is a preferred implementation in the arrangement described herein. Alternative implementations can use different methods and/or skip and/or swap some steps in the FRA. Such modifications can lead to a faster FRA process but some may result in a lower accuracy. The way the gluttonous pipeline advances on the rotating memory buffer is illustrated in FIG. 6. Note that each step in the pipeline may modify the raw data and free some memory from it.

Step 6: Flow Rate Prediction

The flow rate prediction, computed in Step 5, is provided with a timestamp. This value is placed in a double-buffered memory. It can be retrieved by an external component, as specified below in optional steps. The value expresses the feed flow rate in Kg·second$^{-1}$ or in Liters·second$^{-1}$. The outputted value is valid between its attached timestamp and the timestamp of the next outputted value.

Optional Steps

Optionally in an external reporting/monitoring system, the computed feed flow rate value (as defined in Step 6) can be further communicated to an external reporting or monitoring system 18 with or without a visual display.

External Storage

Optionally, the arrangement described herein can provide the outputted feed flow rate value (as defined in Step 6) for storage and future use. The storage can be a local device setup for the arrangement described herein or any conventional commercial online storage system.

Figure 7:
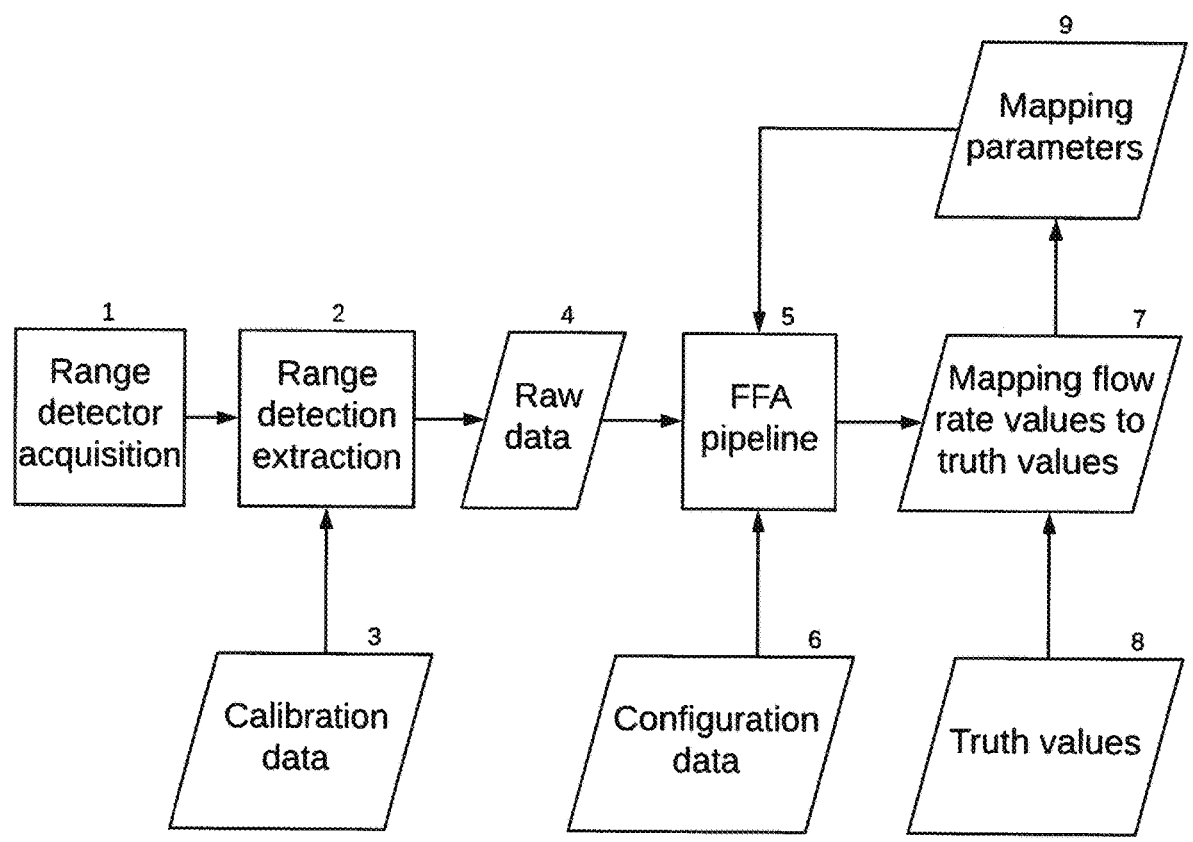
FIG. 7 is a schematic illustration of the overview of the algorithm configuration process of the method of FIG. 5.

Optionally, to increase the accuracy of flow rate calculation, the FRA can be configured onsite before the system, starts taking measurement of the flow rate as a first run. This first configuration run will determine parameters the FRA will integrate into the flow rate computation. FIG. 7 provides an overview of the configuration process conducted on site during the first run of the arrangement described herein.

Steps 1 to 6 within FIG. 7 are as described above in the flow rate estimation process. Steps 7 to 9 are based on the processes known as autoencoder processes. In particular, Step 7 tracks the changes in the truth value and the outputted value from the flow rate algorithm. The process maps truth values to flow rate values encoding the mapping into a function. The value in Step 8 represents the true value of the flow rate. This value can come from a weight scale streaming the measured weight of the fluent solid materials passing through the pipe to provide the total known weight or volume of fluent solid materials having been passed through the pipe.

There is no limit on the amount of truth values that can be used the configure the system. If the truth is expressed in volume, the density of the fluent solid material, the flow rate of which is measured, needs to be entered to the system to convert the volume into weight.

The mapping parameters, encoded in a function are passed back to the FRA. The system can tell when it has enough data to guarantee the encoded values are precise enough to end the configuration step.

Figure 8:
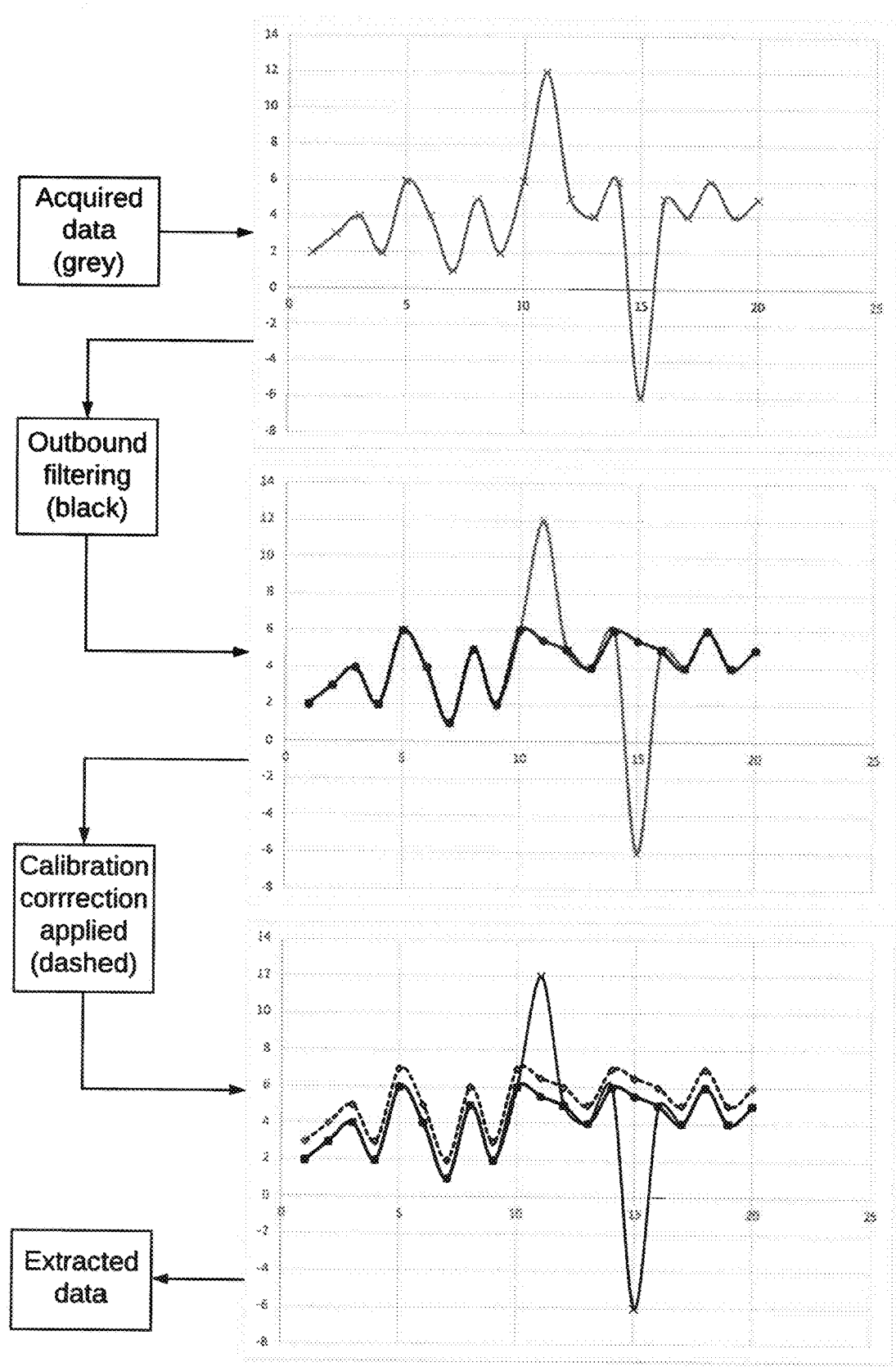
FIG. 8 is a schematic illustration of the data transformation from acquisition to raw data of the method of FIG. 5.

An algorithm is used to extract data from one range detection sensor and is applied at Steps 1 and 2 of the flow rate estimation process as described herein. The input data is referred as distance data (DD), the output data is referred as raw data (RD). The distance range sensor data extraction algorithm uses calibration data to continuously compute RD data from the DD, as described further in regard to calibration. FIG. 8 illustrates how the data is transformed from acquisition to raw data. This corrected data will be the raw data used by Step 5 of the flow rate prediction process.

The FRA are used at Step 5 of the flow rate prediction process. The currently implemented FRA pipeline has a depth of six steps. Each step modifies the original data for the next step. Each step guarantees that the amount of memory used will never increase throughout any of the processes. The FRA considers a delimited chunk of time-stamped data, and each step processes the data in order of its timestamps. Each individual piece of data within each chunk is considered as independent, even for FRA steps that use whole data chunks. This allows each step to mark data as ready for the next deeper step, even if the data chunk is still in use by the current step. The goal is to have the active pipeline as short as possible in order to get as much free memory as possible for new raw data.

Referring to FIG. 5, a first denoising filter I is used as a first denoising pass on the raw data, it voids insignificant medium and high frequency noise and artifacts and is also used to interpolate data over time to increase the raw data resolution. Optionally, this step can be renamed 1a if the implementation uses a metal detection sensor data extraction as step 1b.

Optionally, a metal detection sensor data extraction 1b can be used in parallel of step 1a. Step 1b uses the data from the metal detection sensor to determine the linear auger speed.

An envelope-like filter voids the sine artifact caused by the auger running through the pipe IIa. While voiding this artifact, the auger's speed is also determined IIb. Optionally, implementation can fuse the first denoising filter I and the envelope-like filter IIa.

Optionally, step IIb can use data from a dedicated sensor to determine the auger speed, in that case, step IIb does not exist and is replaced by step 1b. It can be run at any time before step IV.

A second denoising filter III removes high frequency noise possibly generated by the filter on the envelope signal.

Fluent solid material's speed compensation IV is necessary considering that the speed of the fluent solid material flowing through the pipe is a direct derivative of the auger speed, this filter uses output from IIb, optionally Ib in the case that step IIb does not exist, to compensate for the values outputted by step III.

Flow segmentation V segments the data into two states: fluent solid material flowing or not flowing. This method uses both Steps (IV) and (IIb, optionally Ib) output values. Having a fluent solid material not flowing state prohibits the system from considering the background noise as a minimal constant fluent solid material flow. In this case, the flow rate is set to 0.

Volume pipe mapping (VI) converts the 2D data as a timestamped output from V, i.e. height into a volume with dimensions of mm$^3$ using a 3D modeling of the feed flowing through the pipe. This volume is the volume passed below the range detection sensor between two timestamped 2D values as shown at step V. This volume is then converted into a flow, expressed in mm$^3$·s$^{-1}$ using the speed as shown at step IIa, optionally IIb. If available, applying fluent solid material density and viscosity to the flow will give $Kg \cdot s^{-1}$ instead.

The Kalman Filter is a standard filter used to reduce the uncertainty of the FRA computed value outputted using previous values and other FRA pipeline values.

Preferably, each range detection sensor is calibrated to correct their intrinsic errors that may lead to misrepresentation of distances in certain ranges. In particular, to be able to recreate accurate results each distance range sensor used for the embodiment needs to be calibrated to match an arbitrary ideal profile.

Figure 9:
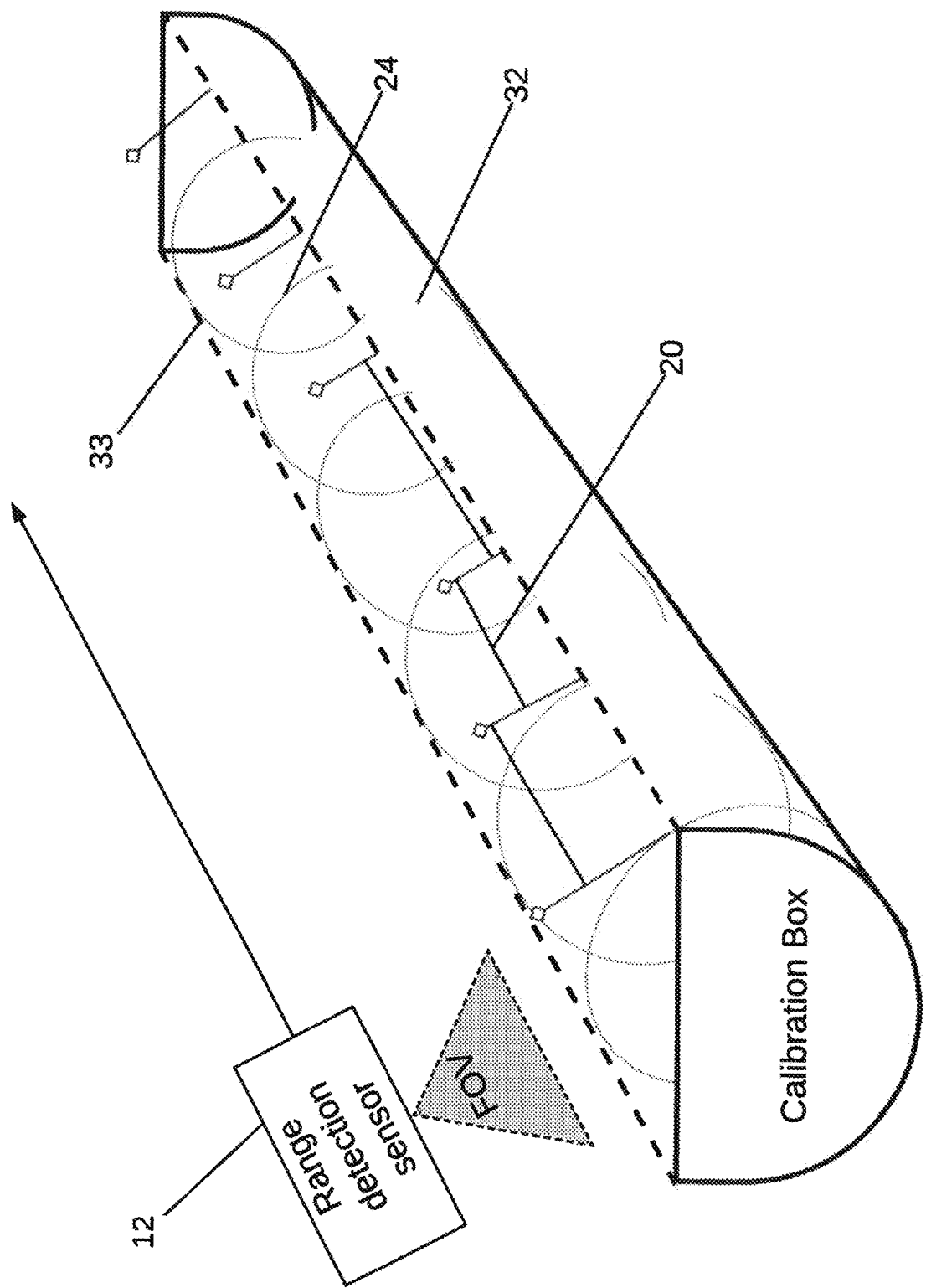
FIG. 9 is an isometric illustration of a calibration box for use in the method of FIG. 5.

The calibration box of FIG. 9 is composed of a feeding pipe section 32 with a preferred diameter of 3 inches, with a 25 mm wide slit 33 cut on the top of the pipe, a sample of the auger/flighting and feed 20 placed into the calibration box. The calibration box should have sections for a variety of feed levels, while the amount of feed placed in them is not critical. In the calibration box, the auger or the feed are not moving. Preferably, the pipe, auger and feed used for the calibration box should be as close as possible to those used in the operational environment where measurements will be taken.

The calibration box depicted in FIG. 9 is one possible implementation used for the system tests. A variety of implementations may exist, the goal is to correct sensor's defects when targeting the auger, the pipe and various heights of the fluent solid material. Optionally, the calibration procedure can be run several times for the same sensor with various types of feed placed into the calibration box at a time to increase the accuracy of distance range sensor data acquisition.

Using different feed heights in the calibration box, an ideal profile for raw data can be created. This profile represents the distance between the distance range sensor and the material inside the calibration box along the distance range sensor's axis movement.

Figure 10:
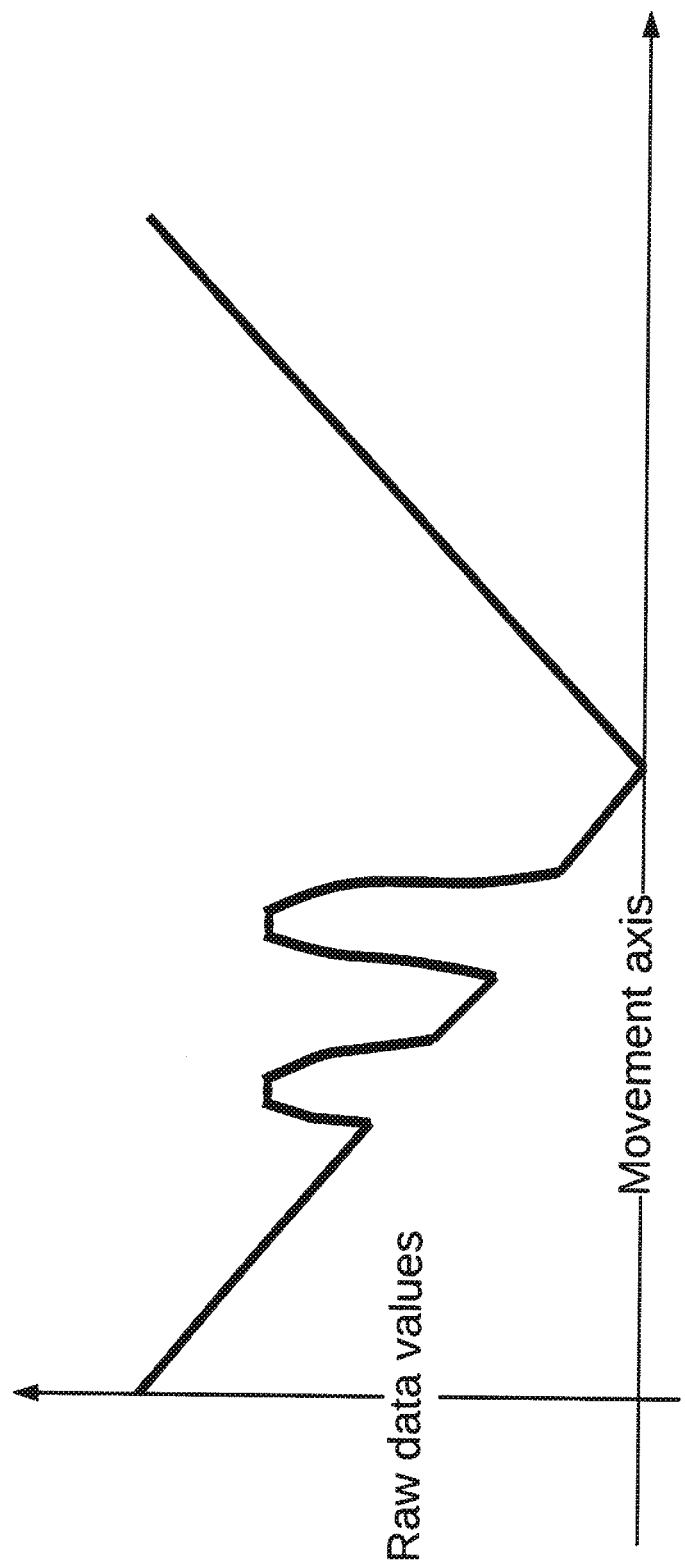
FIG. 10 is a schematic illustration of an ideal profile of the raw data of the method of FIG. 1.
Figure 11:
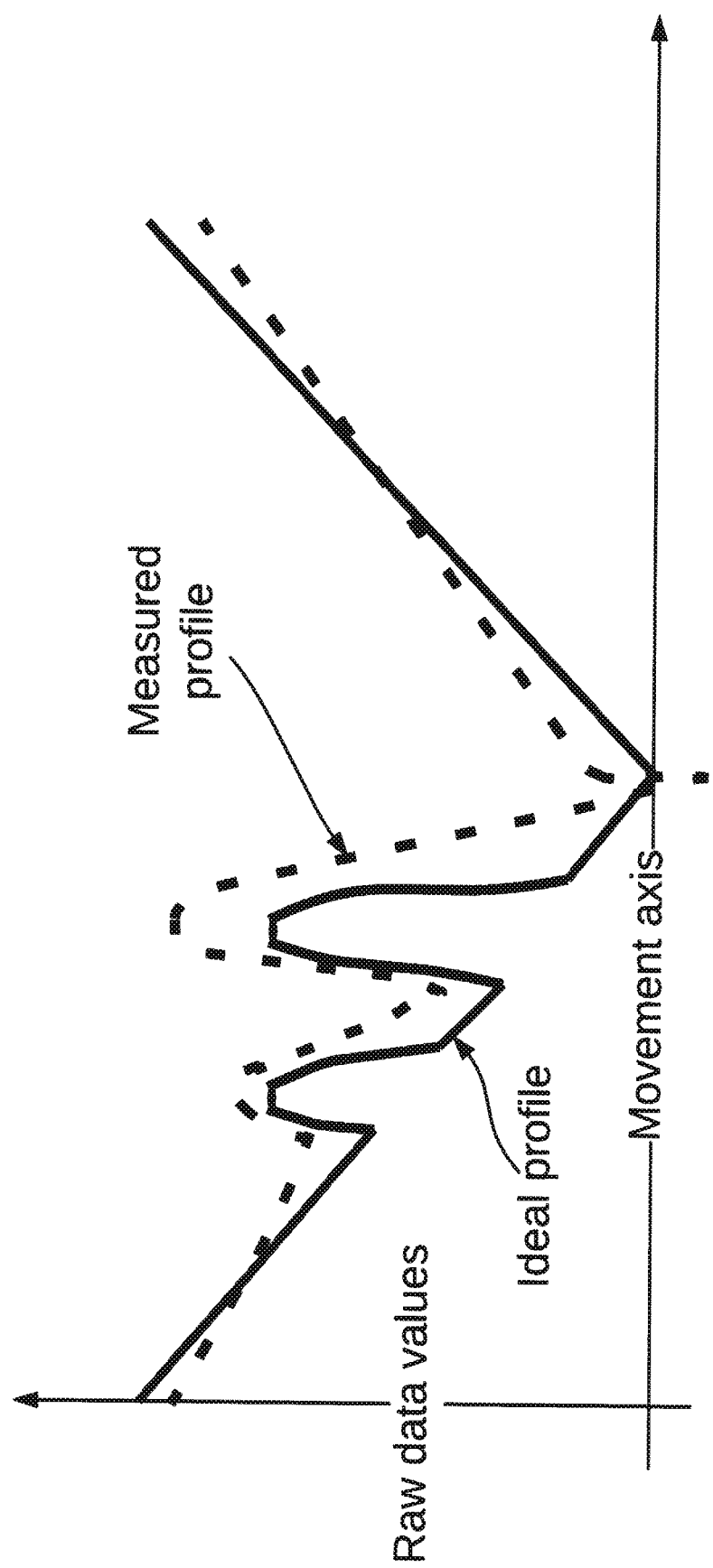
FIG. 11 is a schematic illustration of an example of an uncalibrated profile against the ideal profile of the raw data of FIG. 10.

FIG. 10 illustrates an example of an ideal profile matching the side view of the optional calibration box implementation presented in FIG. 9. An uncalibrated distance range sensor is placed on the open top side of the calibration box. The sensor is slid from one side to the other by a motor to ensure smooth travel. Data is captured from the sensor while it is sliding. The linear speed of the sensor should match the speed at which the measured fluent solid material can be traveling through the pipe. Using the difference between the known profile and the measured uncalibrated profile a calibration transform is computed. The uncalibrated data is put into this transform and data is returned that appears more like the ideal data as illustrated in FIG. 11.

The calibration box is also used to find the right configuration for the distance range sensor including refresh rate, thresholds, etc, thus increasing the stability and accuracy of each of the sensors in the range detection sensor enclosure.

A preferred embodiment of the range detection sensor enclosure integrates three range detection sensors which are aimed at the fluent solid material moving in the pipe at different angles and/or distances as further described in this section. Alternative enclosure designs allow for more or less than three range detection sensors. They all target the feed or the moving mechanical element in the pipe from different angles and/or distances and/or positions. Optionally, the embodiment can comprise of one or more conveyor speed detection sensors.

Figure 12:
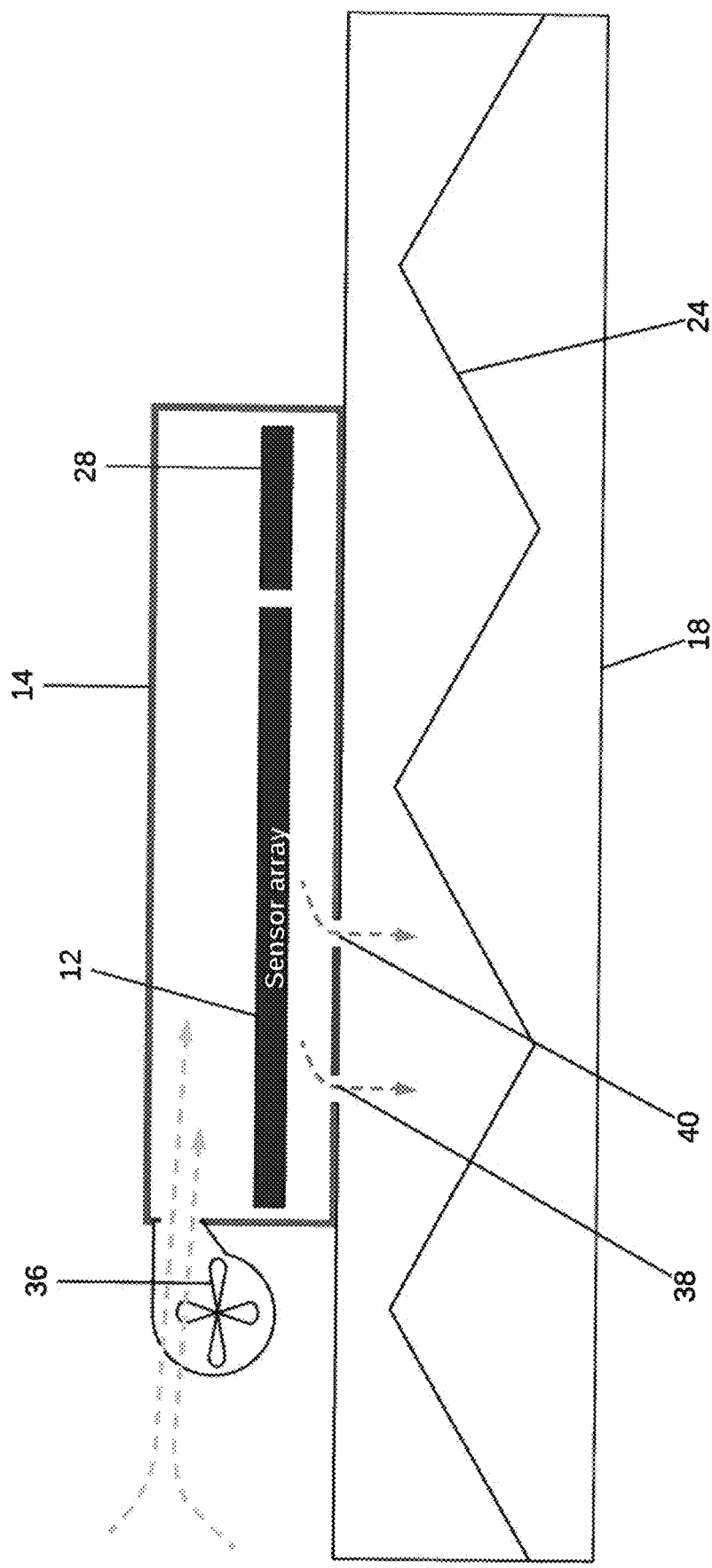
FIG. 12 is a schematic illustration of a range detection sensor enclosure of the method of FIG. 1.

One embodiment of the enclosure is shown in FIG. 12 and comprises an air blower 36 set up in a way to create an overly pressurized area in the enclosure 14. The excess pressure is evacuated through the range detection sensors array holes 38 and 40, into the pipe. The resulting airflow does not affect the flow of the materials in the pipe and prevents the dust created by the materials flowing to enter the enclosure.

As an option, the sensor array can be comprised of one or more speed detection sensor 28 used to determine the linear speed of the moving mechanical element.

In order to create a pressurized area, the enclosure 14 is made of any material that is airtight. The enclosure is made as small as possible around its components to create the pressurized area as fast and as stable as possible.

Since the range detection sensor needs its light beam to return to the sensor, a hole is required to be drilled into the pipe. In order to prevent feed from falling out of the pipe, the holes are drilled on the top side of the feeding pipe. The holes 38 and 40 are preferably small enough to be covered in case the range detection enclosures need to be removed.

Figure 13:
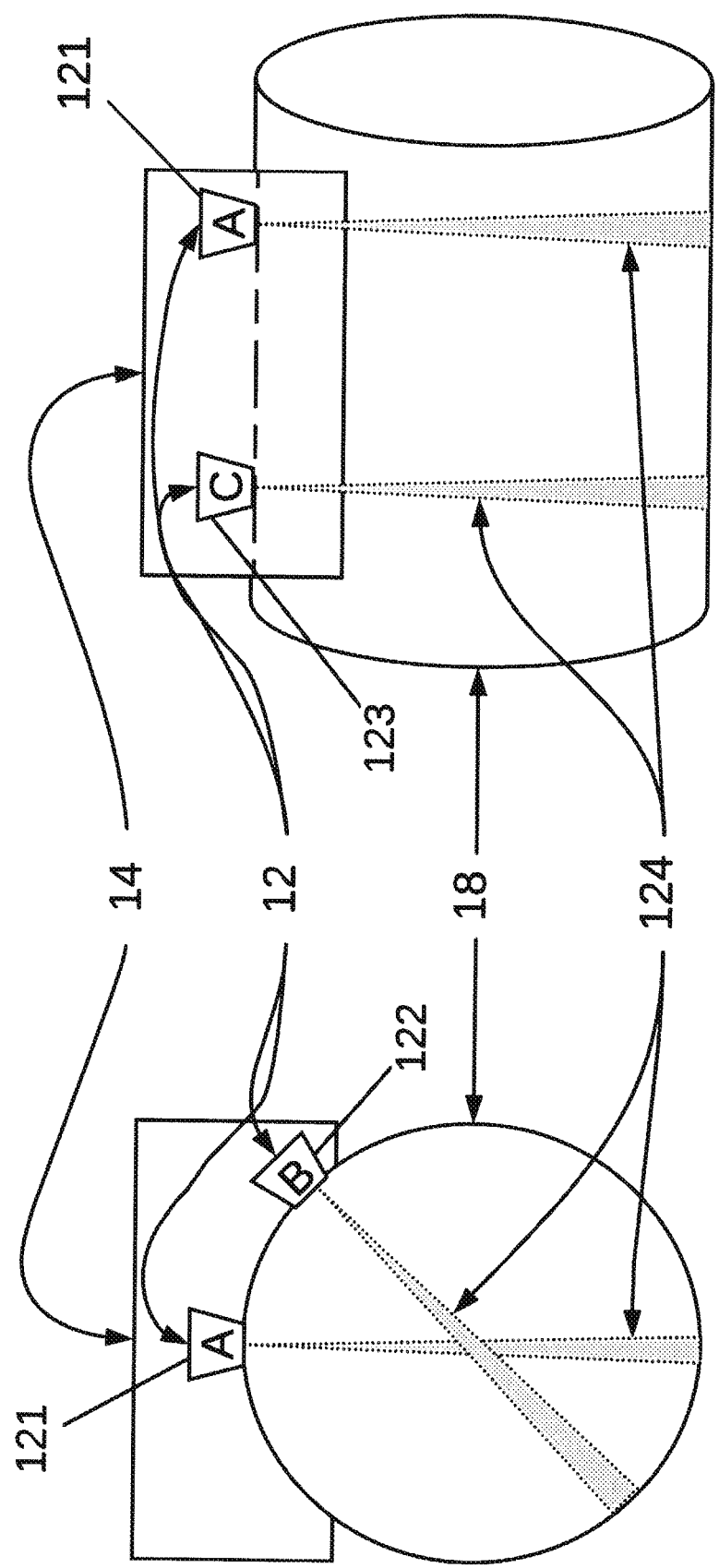
FIG. 13 is a schematic illustration of a first embodiment of preferred sensor placement inside the enclosure of FIG. 12.

A preferred placement for three range detection sensors 12 inside the enclosure is illustrated at 121, 122 and 123 in FIG. 13. Preferably, the angle of the analysis beam 124 as shown for range detector sensors 122 and 123 when not vertically aligned is between 30 and 45 degrees. The minimal space as shown between sensor 121 and sensor 123 is 10 mm. The distance between 121 and 122 is determined by the section of the pipe between them.

Having multiple angles and positions for each sensor is beneficial for the accuracy of the Kalman filter used in flow rate algorithms as described above in the flow rate detection process.

Figure 14:
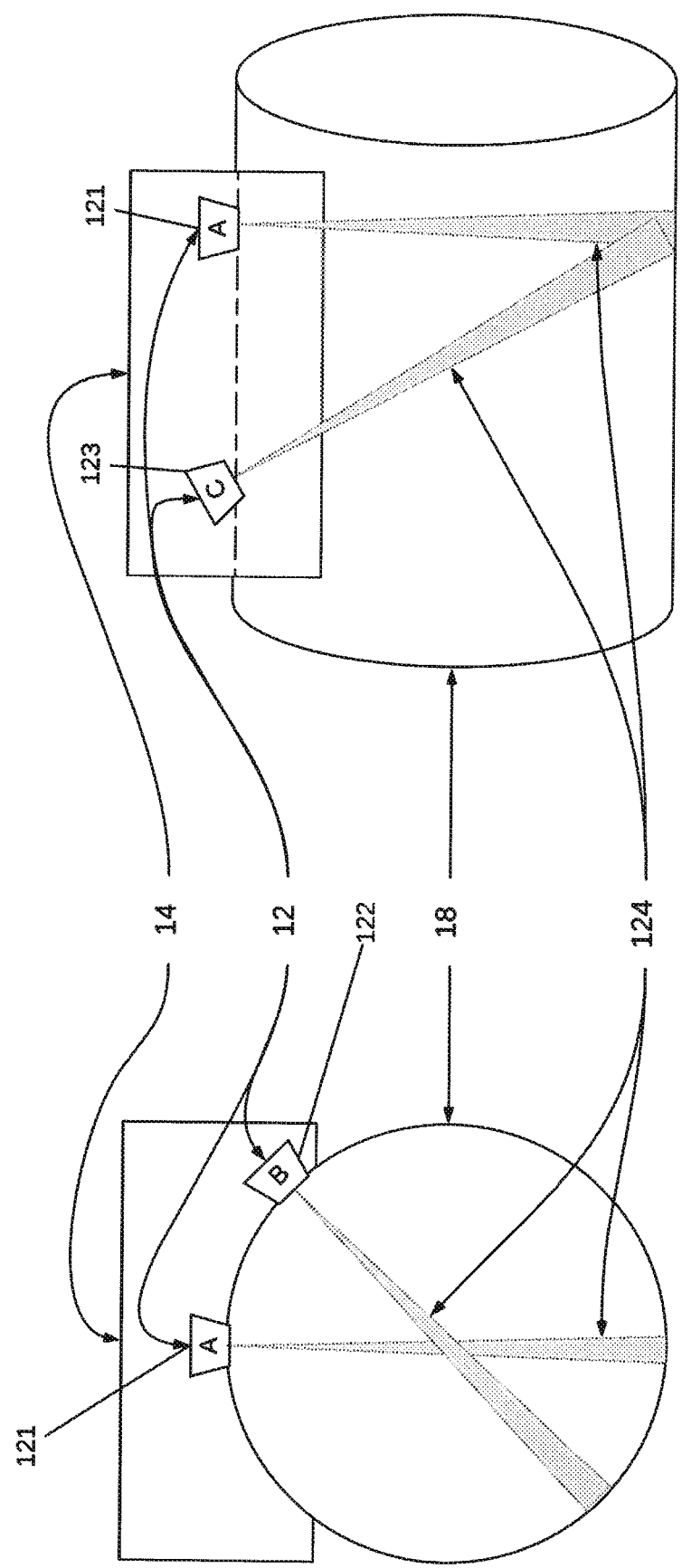
FIG. 14 is a schematic illustration of a second embodiment of preferred sensor placement inside the enclosure of FIG. 12.

Alternative placement can change the angle and/or the position of the sensor(s), as illustrated at FIG. 14, or be adjusted to a larger or lesser number of range detection sensors or any type of environmental sensors.

Figure 15:
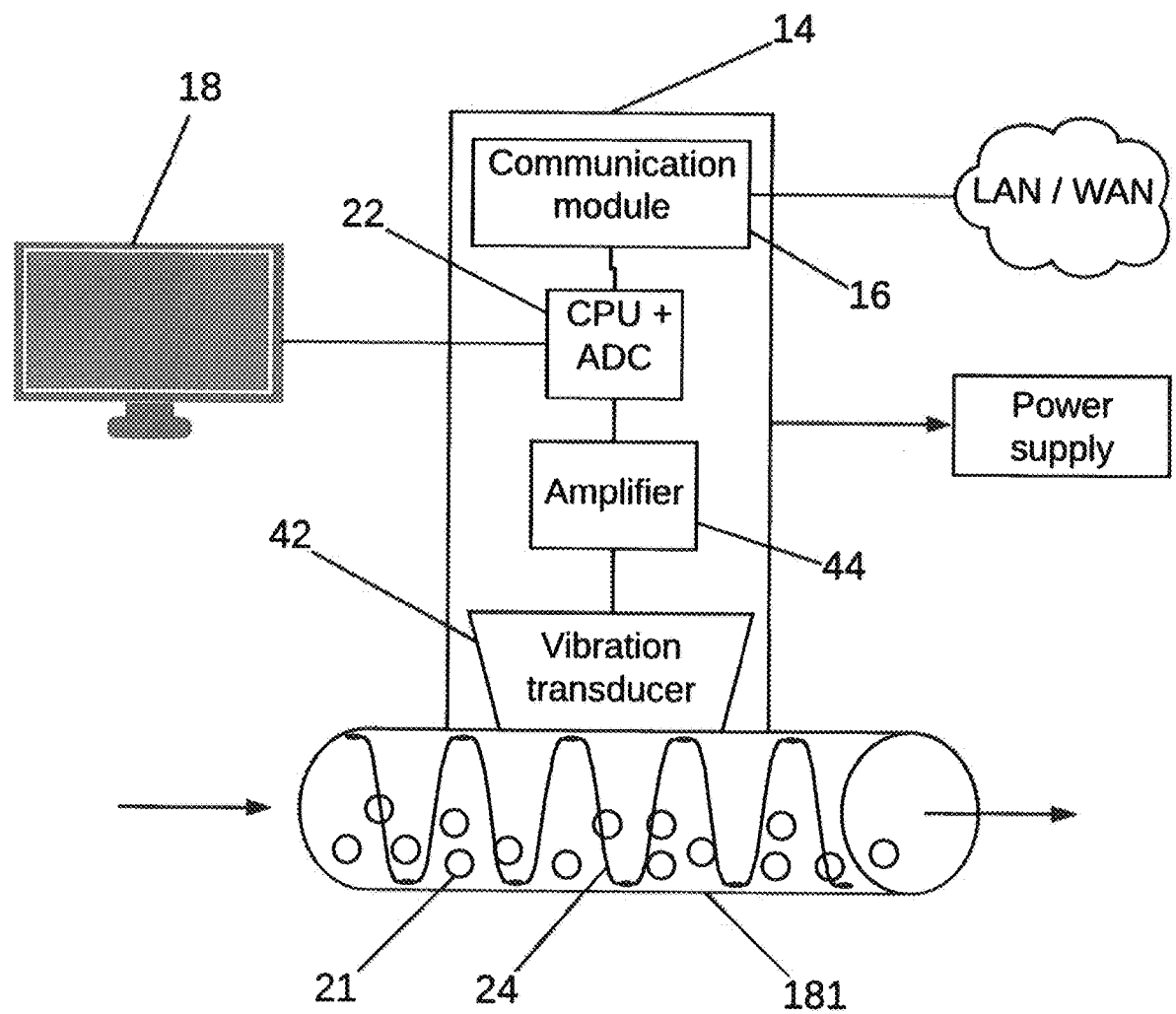
FIG. 15 is a schematic illustration of an overview of a second embodiment of a method according to the present invention.

Additional information can be obtained for use in the present invention as disclosed in FIG. 15 and is comprised of the following components. In FIG. 15 is shown the alternative arrangement of a disc conveyor where the auger flighting 24 shown in FIG. 1 is replaced by disc conveying system including discs 24A.

A vibration sensor 42 is provided which can be comprised of any vibration detector that captures frequencies from 1 Hz to 20 kHz, in particular but not limited to a commercial audio pickup that records vibrations of a solid object, not the air. A preferred option is an audio pickup for music recording, since they are built to respond to a specific frequency band which is required for this embodiment. Alternatively, a commercial piezo-electric transducer can be used.

Only one sensor is required for this embodiment. Optionally, more sensors can be used to improve the reliability of the predicted flow rate. A commercial amplifier 44 is used that limits distortion of the signal while allowing an Analog-to-Digital Converter (ADC) to read it. A commercial ADC is used to convert the analog signal into a digital signal for the audio preprocessing.

The Data Processing Module is comprised of a commercial Processing Unit (MCU, CPU or the like), similar to those used in smartphones or internet of things (IoT) devices, with preloaded data and machine learning (ML) algorithms. Preferably, the Processing Unit embeds the required ADC.

Custom software algorithms as described below are pre-loaded ML data. The pre-loaded data are built using the learning process as known in the State of the Art (SotA) machine learning techniques.

The enclosure has enough space to embed all the parts and includes a mount that mechanically couples the vibration transducer to the pipe without modifying the signals detected. None of the parts are placed inside the tube of the feeding system itself. This allows the enclosure for the arrangement described herein to be totally dustproof using a proper dust insulation without interfering with data acquisition.

Figure 16:
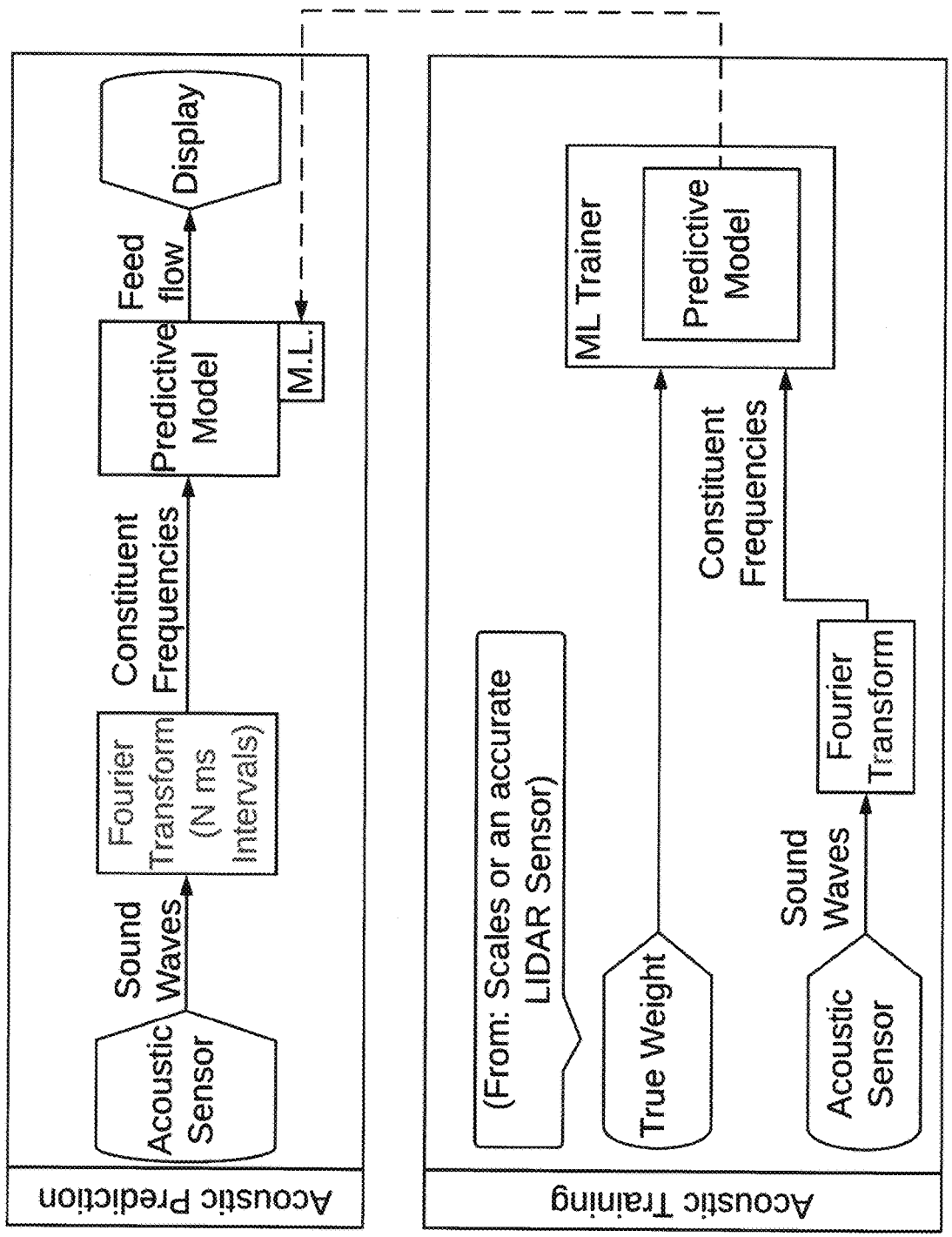
FIG. 16 is a schematic illustration of the overall data flow overview of the method of FIG. 15.

A connectivity/communications module is provided by electronic components that allow for communication with other computers using conventional communication protocols. The embodiment can determine the flow rate of the fluent solid materials using vibration sensor to measure the vibration in the pipe by applying ML methods (See FIG. 16). The ML algorithm must be trained with a significant amount of data (data tensors along with truth data). While training, the ML service will iteratively make predictive models. At the end of the training step, the last issued predictive model will output values on its training data with a minimal error in comparison to the truth data.

Once training is completed, the model will then accurately predict the flow rate based on new input data. In order to be accurate, the predictive model must be trained with relevant data. To be relevant, the data must be correlated to the truth data to which it is linked. The constituent frequencies generated by the feeding system are chosen as the most relevant data to build an accurate predictive model. These vibrations can be acquired with audio pickups placed on the feeding pipe.

In the flow rate estimation process, a vibration transducer array is continuously acquiring data. Data is extracted from the vibration transducer to form a usable standard waveform raw audio file and stored in the computer's memory. Audio preprocessing is performed by a custom software in order to extract useful features for the ML forward propagation. Audio features are stored into the computer's memory. A ML forward propagation is performed on audio features.

Figure 17:
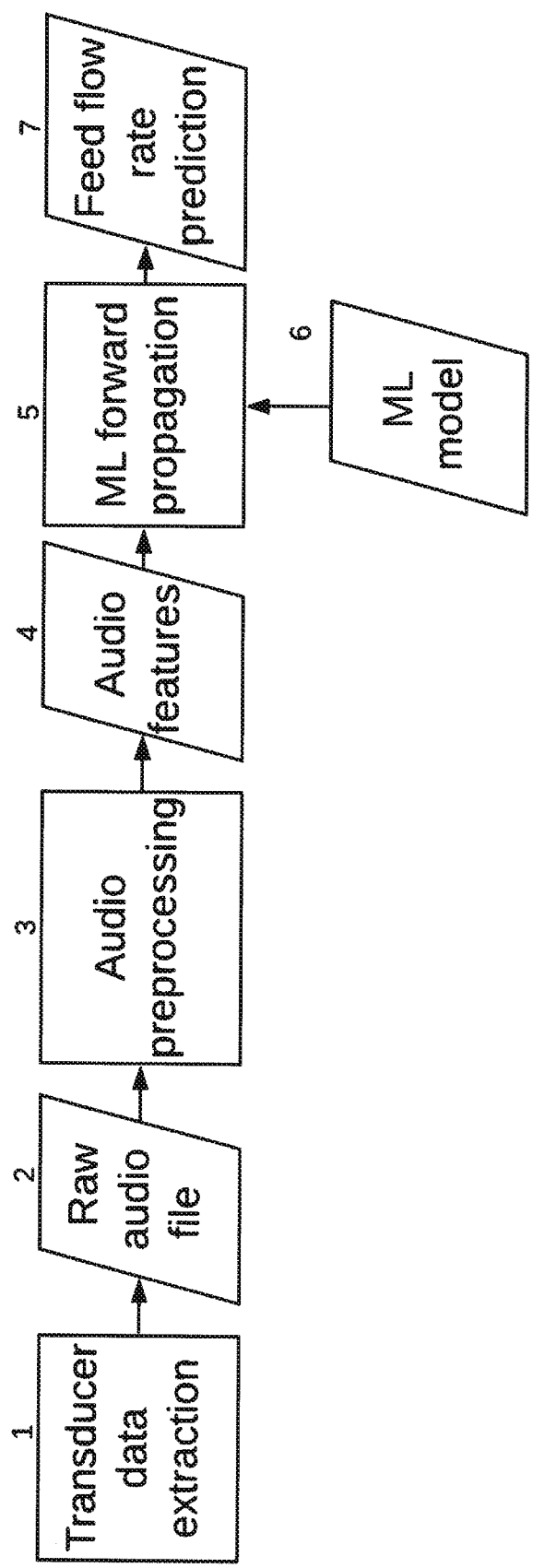
FIG. 17 is a schematic illustration of the flow rate estimation process of the method of FIG. 15.

Optionally, the process can be performed locally. Optionally, the ML forward propagation can be processed online. When using online ML forward propagation, the ML algorithm can be an updated version of itself based on the evolving SotA learning techniques. This implementation will require a subscription to an online ML service and a connection to it. The ML preloaded model is used for the Step 5 in FIG. 17. The flow rate prediction is stored in the computer's memory.

Optionally, an external monitoring system can be used to report the computed feed flow rate. Optionally, the feed flow rate prediction can be stored locally or published online In the Machine Learning method, one implementation of the method for the ML model training is described. The ML model is trained on labeled data gathered by the following process. The labeled data consists of processed audio data segments for a given time window and corresponding mass flow for that time window.

This is collected by gathering audio data and known absolute weight data of feed source (e.g. from load cells) simultaneously. The weight data is synchronized with the audio data based off of when the feed would leave the bin, and the corresponding feed would cross the audio sensor. Note that this distance in principle could be zero.

With synchronized audio and absolute weight data, audio data is sliced up into chunks. The corresponding weight data for the corresponding audio segments is interpolated. A difference between the interpolated weight data segments is taken to approximate the amount of mass that is passing through that segment of pipe where the audio sensor is attached within that time window.

This enables the retrieval of audio data segments corresponding to mass flow for the associated time window. This data is used as training data for the ML model. The model will learn how the vibrations in the pipe will correspond to a mass flow of feed. Since the model is trained on learning mass delta for a specific time window, the model is learning mass velocity through the pipe based off the pipe vibrations.

A vibration transducer sensor reacts to vibrations going through its body. Preferably, an audio pickup is used due to its specific acquisition properties overs certain frequency ranges. It outputs an electrical signal proportional to the amplitude of the vibration. The output has the shape of a waveform. An audio pickup, preferably, in an enclosure as described in the Preferred Embodiment section above, as well as in FIG. 12, is placed in contact with the pipe, and the outputted waveform is derived from various related vibrations.

Thus, in the case of a feeding system, such vibrations going through the system can be as follows:
  Vibrations induced by the movement of the feed pellets or mashed feed chunks scraping into each other.
  Vibration induced by the conveyor moving in the feeding pipe, scraping on the feeding pipe and on the pellets/mashed feed.
  Vibration induced by the motor attached to the conveyor.

The amplitude and frequencies of these vibrations contain characteristics which depend on the type and composition, amount, and speed of the feed flowing inside the pipe. All these combined vibrations are acquired by the transducer and outputted as a waveform. The audio pickups are set up to get the most significant data for the feed flow application.

Figure 18:
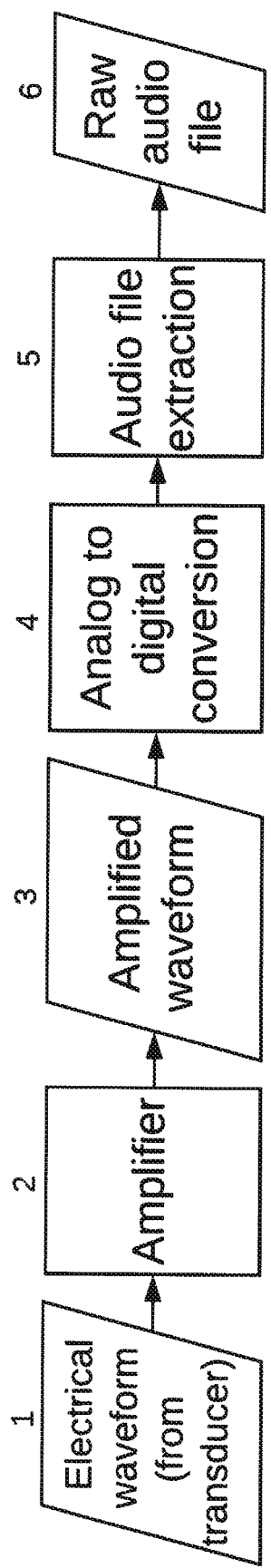
FIG. 18 is a schematic illustration of the transducer data extraction of the method of FIG. 15.

The process is comprised of an amplifier, an ADC and a custom-made software, see FIG. 18 for an overview. The amplifier's role is to electrically increase the level (box 2) of the waveform outputted by the audio pickup (box 1). The ADC converts the electrical analog values of the amplified waveform (box 3) into digital values (box 4). The software translates the digital values (box 5) from the waveform into a raw audio file (box 6), suitable for memory storage.

This extracted waveform is split into pre-defined time interval waveforms. These intervals are long enough to guarantee that the lowest frequencies can be extracted. The size of an interval cannot be too long in order to optimize the process described in Step 4 within FIG. 17, and to guarantee a real time feed flow rate prediction Storage of raw audio data needs a large amount of memory. Each audio sample is stored in memory along with timestamps.

This step involves application of several custom software algorithms aimed at extracting useful features from the raw audio data. The features must be meaningful for the ML propagation, emphasizing the audio variations observed as induced by flow rate variation. The features are also needed to have a very small memory footprint. Algorithms are built based on the known techniques, like Fast Fourier Transform (FFT), noise cancelling, low pass filters and any other audio feature extraction algorithm related to signal processing.

Audio features are stored into memory. The most significantly used audio features for the ML process are the constituent frequencies of the acquired waveform. These features are smaller than the raw audio data (usually by a factor of 1000). This data must be stored in a tensor form directly usable by the ML software.

This is the forward propagation algorithm on the tensor described in Step 3. It outputs a flow rate prediction. The ML model used for forward propagation had been built using a significant amount of audio features attached to verified flow rate results as illustrated in FIG. 15. The forward propagation algorithm can be one that is well known known in the industry, for example the system has been successfully tested with the Microsoft Azure Machine Learning Platform.

Optionally, an online ML forward propagation can be used. In this case the arrangement described herein provides wireless connectivity (as defined in ISO 802.11, 802.15.4 or 802.15.1) or a wired connectivity used to transmit the extracted audio features to the online ML service. Possible options are illustrated in FIG. 2. This represents the pre-loaded (optionally online) ML data model used for forward propagation. It is used in Step 5 of the flow rate estimation process outlined in FIG. 17.

The flow rate prediction computed in Step 5, is provided with a timestamp. This value is placed in a local double buffered memory. Optionally, it can be retrieved by an external component as described below.

The value expresses the feed flow rate in $Kg \cdot s^{-1}$ or in $Liters \cdot s^{-1}$. The outputted value is valid between its attached timestamp and the timestamp of the next outputted value.

The embodiment comprises wireless (as defined in but not limited to 802.11, 802.15.4 or 802.15.1) or a wired connectivity used to transmit the computed feed flow rate prediction. Possible options are illustrated in FIG. 2.

Each of the above described standalone solutions produces an accurate flow rate prediction based on different techniques. The method based on distance range sensor uses the height of the solid fluent material and, as applicable, the speed of the auger in the pipe, while the method based on the acoustic sensor uses the vibrations of the pipe. The calculated measurements are correlated as they are derived from the material flow rate in the same pipe, but they are obtained independently.

The result of a combined solution is a system with added redundancy, reduced uncertainty and improved accuracy. In particular, combining the flow rate outcome obtained independently from each method will give a new calculated feed flow rate measurement that is significantly less noisy and more accurate. A combination of sensors used in this combined solution can allow one to determine more properties of the flowing fluent solid materials, e.g. its density, water content and constituents.

There are many methods that can be used for combining different data sources to improve feed flow prediction accuracy. Standard approaches, such as utilizing a Kalman Filter are preferred because they don't require significant computational power and have been proven to have a very good accuracy. Additionally, these methods are very fast, and are therefore capable of maintaining the same refresh rate as the two standalone arrangements.

Alternatively, well known approaches such as Voting System, Weighted Voting System, or any other output value consolidation approach using environmental or other relevant data, can be used to provide the best solution according to their accuracy with consideration to the external conditions and/or feed type.

A combined approach uses a specific three-staged algorithm which refines the result by giving more importance to reliable individual sensor outputs and excluding outlier values (e.g. from a defective sensor).

This particular embodiment can be generalized and be applicable to any number of acoustic sensors and lidar sensors. A preferred optional embodiment described further uses two lidar types and one acoustic type of sensors.

The algorithm is made of three stages that lead to a final refined flow rate predication. The stages are outlined below:

Scoring: This first stage estimates how reliable each individual output from each sensor is, this is classified as a confidence score. The stage takes as many predicted flow rates gathered from the separate processes applied to the acoustic and/or range detection sensor data. These are expressed in $Kg \cdot s^{-1}$ or in $Liters \cdot s^{-1}$. This stage uses data from its previous state.

Mix: The Mix stage computes a new confidence score based on the outputs of the Scoring Stage, as well as outputs from previous iterations of the Mix Stage. This stage checks each predicted output from the scoring stage against all other predicted outputs also from the scoring stage. These outputs, whether acoustic or lidar, will be processed alongside all other sensor outputs. The Mix Stage outputs as many new predicted feed flow rates as there are permutations of two inputs. These values are temporary values used as inputs in the next stage.

Voting: The stage outputs the final refined feed flow prediction expressed in in $Kg \cdot s^{-1}$ or in $Liters \cdot s^{-1}$. It uses both predictions and scores from the Mix stage.

Figure 19:
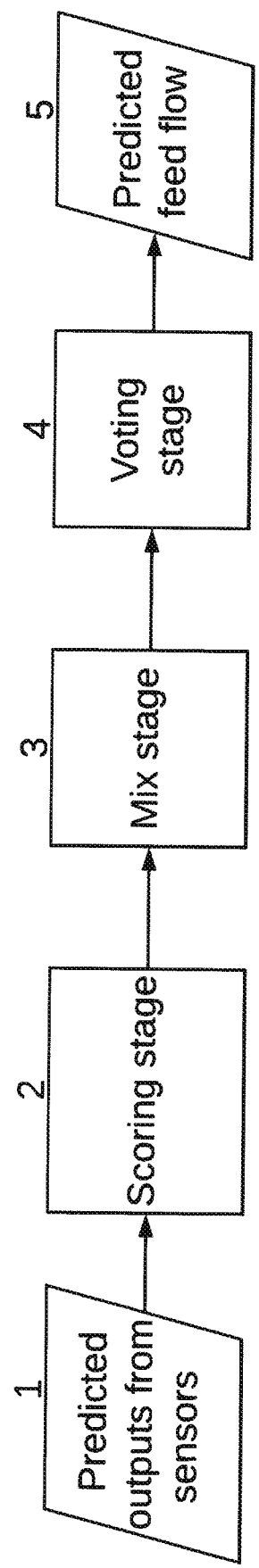
FIG. 19 is an Overview flow diagram of three stage algorithm for the combined methods of FIGS. 1 and 15.

An overview data flow diagram is presented in FIG. 19. Each stage may comprise filters or sub filters as described in more detail below. Each stage takes the output of the previous stage as an input.

Figure 20:
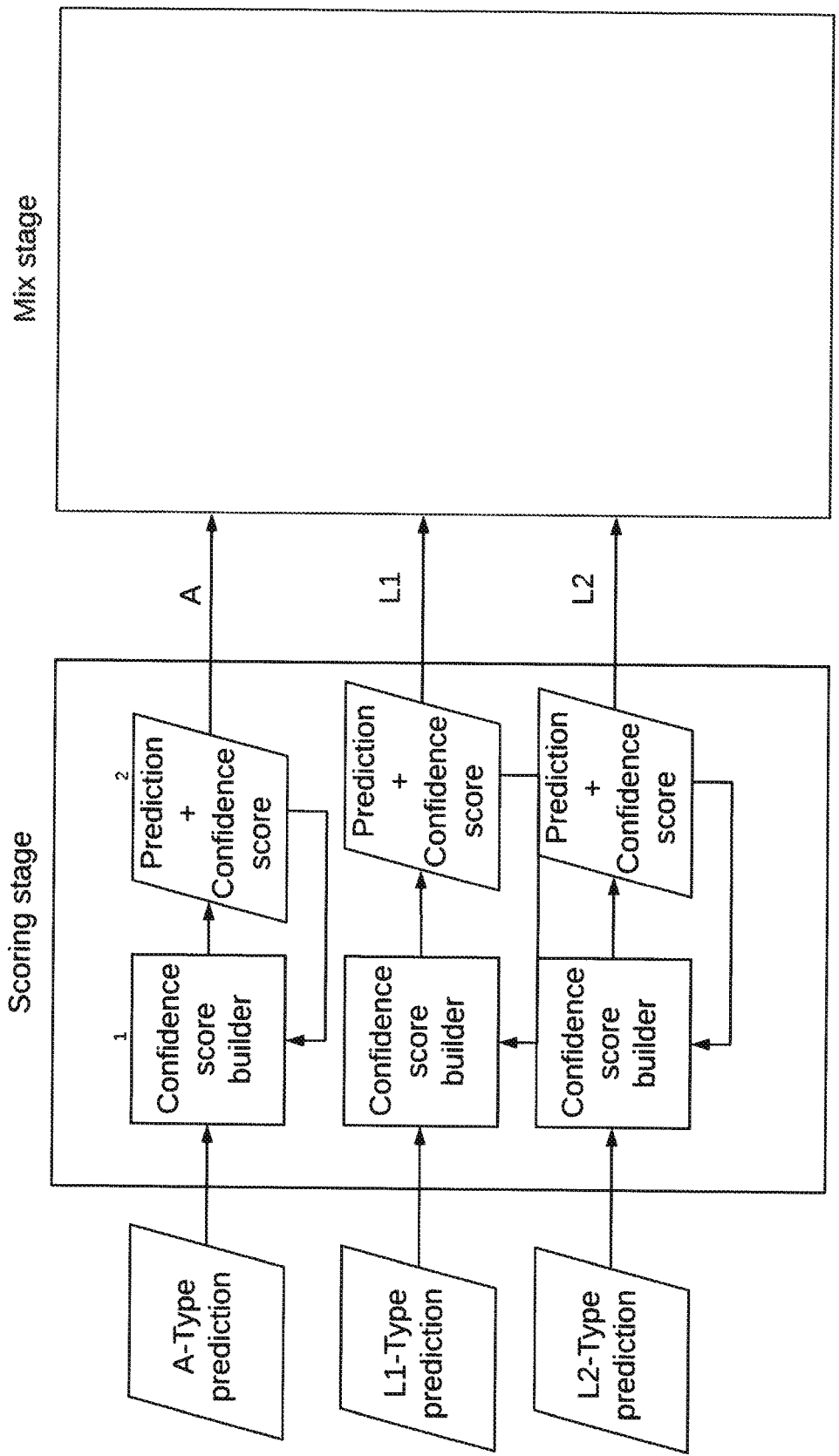
FIG. 20 is an Overview of the Scoring Stage of the algorithm of FIG. 20.

The Scoring Stage builds a confidence score on each sensor prediction (See block 1 in FIG. 20). It uses the previous prediction to detect outliers. Outliers are defined as values greater than three standard deviations from the mean of the signal. In our case, we consider the gradient between the actual value and the previous value to detect outliers. It uses heuristics on feed flow variations to give a confidence score to any value according to the previous one. Because each sensor has a noisy output, precomputed heuristics can be used to avoid over-detecting outliers.

The outputted data from the Mix Stage consists of the following (same structure for acoustic (A) and range detection sensors (L1 and L2)) (See block 2 on FIG. 20):

The outputted prediction (unchanged) The confidence score attached (new)

In the Mix Stage, the filters used are a custom implementation of the Kalman filters. They run two processes: computing new predictions and computing a new confidence score for them. A new confidence score and a predicted value are linked together. Each K block in FIG. 21 is a custom Kalman filter implementation.

Each new prediction made from a K block uses the following inputs: one of the predicted feed flow rates as theoretical data, any other predicted flow rate as truth data and the previous mix stage result as memory data.

For each new confidence score from a K block: their inputs are the confidence scores coming from the scoring stage and the score from the previous state. Confidence score is a value which indicates how reliable the new predicted value is.

Figure 21:
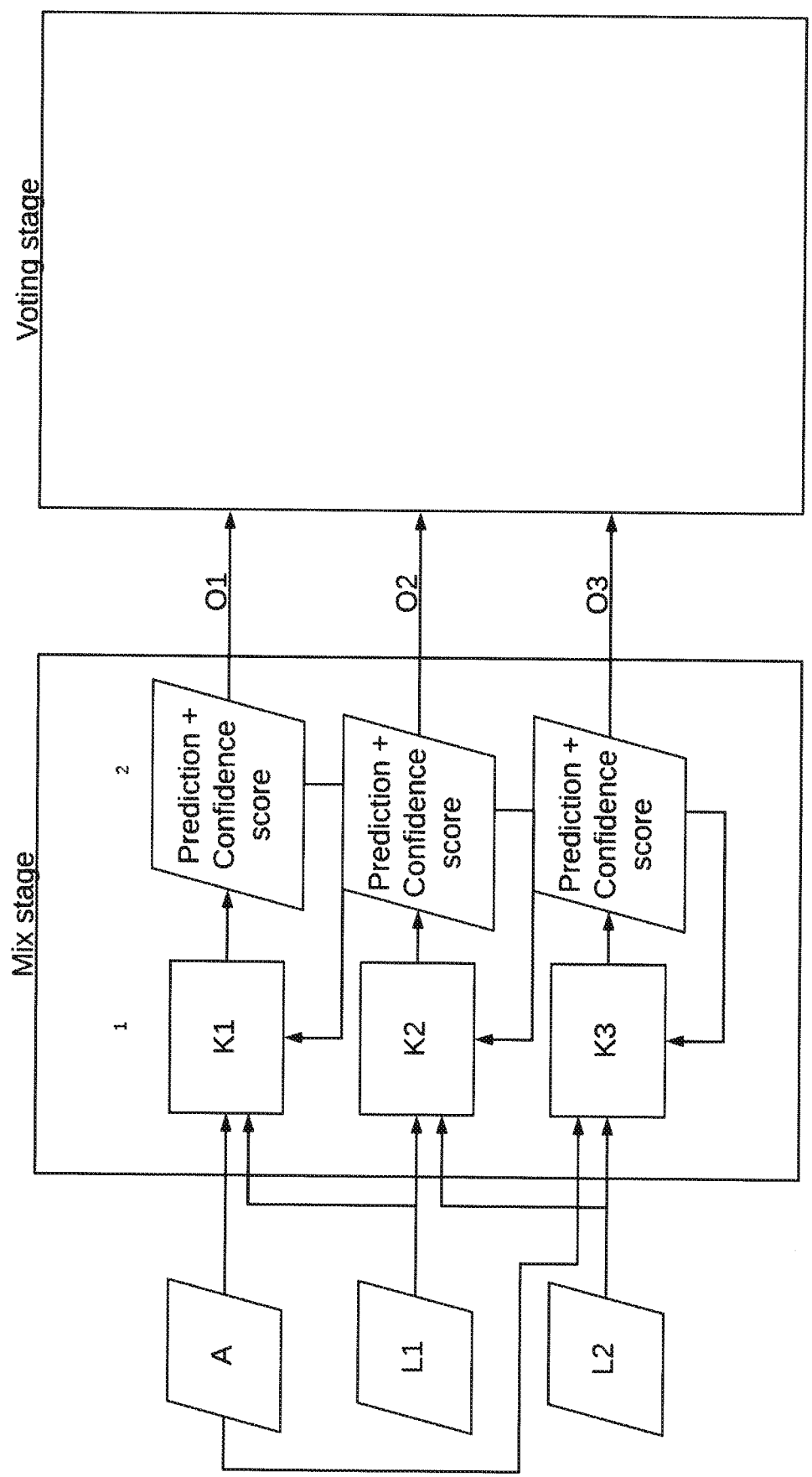
FIG. 21 is an Overview of the Mix Stage of the algorithm of Figure

The outputs are made of two values, one is a precited output expressed in $Kg \cdot s^{-1}$ or in $Liters \cdot s^{-1}$, the other one is the confidence score (See block 2 at FIG. 21).

Figure 22:
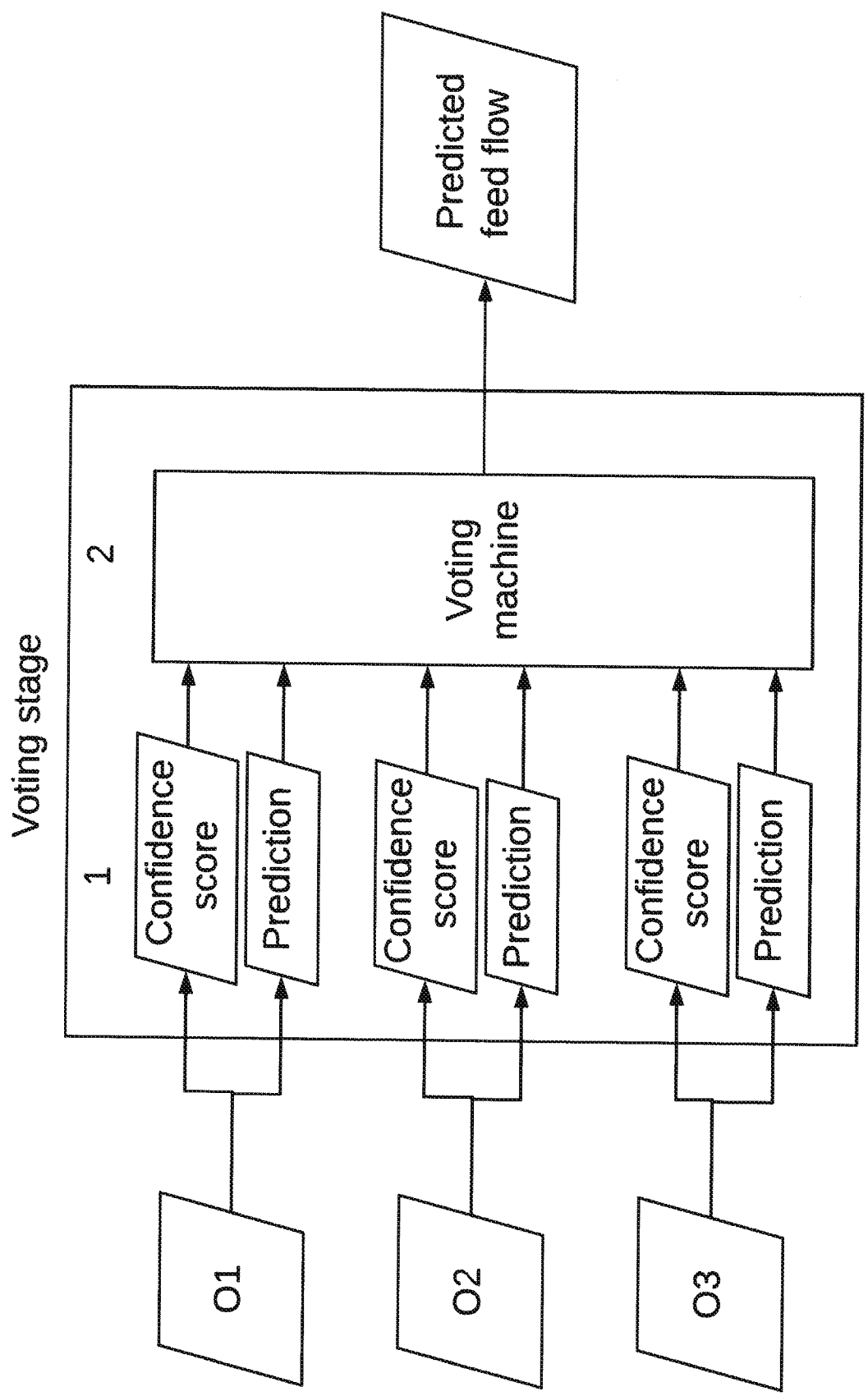
FIG. 22 is an Overview of the Voting Stage of the algorithm of Figure In the drawings like characters of reference indicate corresponding parts in the different figures.

In the Voting Stage, the input data comes from the Mix stage (See block 1 at FIG. 22). The voting machine takes all the predicted values along with their confidence scores from the mix stage and processes a variant of a voting algorithm. Confidence scores are used as weights and values are used as candidates. The custom voting algorithm is a preferred implementation, other algorithms can be used instead. The outputted value is the final predicted feed flow rate expressed in $Kg \cdot s^{-1}$ or in $Liters \cdot s^{-1}$.

The arrangements described herein both independently and in combination may provide one or more of the following advantages:

- A method and a system which can be used in the commercial livestock industry for a highly repeatable flow rate measurement.
- A method and a system which can be used for providing highly accurate close to real time measurement data.
- A method and a system which can detect when the feeding system is running without any fluent material n the pipe. This can be due to a clog, a leak in the system, an empty bin, a feed bridge, or many other common scenarios.
- A method and a system which can be used under harsh environmental conditions, including high volume of dust.
- A method and a system which is low cost and can be implemented with low cost hardware and electronic components
- A method and a system which is non or minimally intrusive, does not interfere with the flow of feed and does not typically touch the feed in the feeding pipe
- A method and a system that can be easily installed on feeding systems of existing and new livestock farms.
- A method and a system which can be used at any number of locations of a feeding pipe to take measurements related to the entire barn, a group of animals or an individual animal
- A method and a system which is modular, requires minimal maintenance and can be easily and cheaply updated in the field (new sensors, new microcontroller, new software).
- A method and a system which has imbedded wireless communication capabilities and can be easily integrated with other systems used in the commercial livestock industry Since various modifications can be made in the invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for providing an estimate of a flow rate of a fluent solid material comprising:
   a generally horizontal cylindrical pipe;
   a movable transportation element in the pipe for transporting the material along the pipe;
   wherein the movable transportation element comprises at least one auger flight surface in the pipe rotatable around an axis of the pipe;
   a plurality of distance sensors mounted in the pipe in an upper part of the pipe and arranged to detect a distance of the material in a lower part of the pipe from the distance sensor and to generate distance signals in response thereto;
   and a control system for analyzing the distance signals from the distance sensors over time to provide the estimate of flow rate.

2. The apparatus according to claim 1 wherein the control system includes an envelope filter to remove a sine artifact caused by said at least one auger flight surface rotating in the pipe.

3. The apparatus according to claim 1 wherein there is provided a rate detection sensor for detecting a rate of rotation of said at least one auger flight surface and wherein the control system is arranged to use the rate of rotation for analyzing the distance signals from the distance sensors over time to provide the estimate of flow rate.

4. The apparatus according to claim 3 wherein the rate detection sensor comprises a sensor responsive to presence of metal of said at least one auger flight surface at a location along the pipe.

5. The apparatus according to claim 4, wherein the control system is arranged to use a direct derivate of the rate of rotation of said at least one auger flight surface.

6. The apparatus according to claim 1 wherein the control system is arranged to use a volume pipe mapping algorithm to convert said distance signals in 2D data form from the distance sensors into a volume.

7. The apparatus according to claim 1 wherein each of the distance sensors is mounted in a sensor enclosure carried on the pipe.

8. The apparatus according to claim 7 wherein a blower is provided to create an over pressure in the sensor enclosure.

9. The apparatus according to claim 8 wherein the over pressure is evacuated into the pipe to prevent dust created by the fluent solid material flowing to enter the sensor enclosure.

10. The apparatus according to claim 1 wherein the distance sensors are located at different angles around the axis of the pipe.

11. The apparatus according to claim 1 wherein the distance sensors are arranged at spaced positions along the pipe and are directed to detect said distance at spaced positions along the pipe.

12. The apparatus according to claim 1 wherein the distance sensors are arranged at spaced positions along the pipe and are directed to detect said distance at a common position in the pipe.

13. The apparatus according to claim 1 wherein there is provided a second estimation system for providing second estimate of flow rate and wherein control system is arranged to compare said second estimate with said estimate of flow rate in order to remove errors.

14. The apparatus according to claim 13 wherein the second estimation system uses a vibration sensor mounted on the pipe so as to be responsive to vibrations in the pipe.

15. The apparatus according to claim 1 wherein a vibration sensor is mounted on the pipe responsive to vibrations in the pipe which provides an input to the control system.

16. An apparatus for providing an estimate of a flow rate of a fluent solid material comprising:
   a generally horizontal cylindrical pipe;
   a movable transportation element in the pipe for transporting the material along the pipe;
   a plurality of distance sensors mounted in the pipe in an upper part of the pipe and arranged to detect a distance of the material in a lower part of the pipe from the distance sensor and to generate distance signals in response thereto;
   and a control system for analyzing the distance signals from the distance sensors over time to provide the estimate of flow rate;
   wherein each of the distance sensors is mounted in a sensor enclosure;
   wherein a blower is provided to create an over pressure in the sensor enclosure;
   and wherein the over pressure is evacuated into the pipe to prevent dust created by the fluent solid material from entering the sensor enclosure.

17. The apparatus according to claim 16 wherein the control system is arranged to use a volume pipe mapping algorithm to convert said distance signals in 2D data form from the distance sensors into a volume.

18. The apparatus according to claim 16 wherein the distance sensors are located at different angles around the axis of the pipe.

19. The apparatus according to claim 16 wherein the distance sensors are arranged at spaced positions along the pipe and are directed to detect said distance at spaced positions along the pipe.

20. The apparatus according to claim 16 wherein the distance sensors are arranged at spaced positions along the pipe and are directed to detect said distance at a common position in the pipe.

21. An apparatus for providing an estimate of a flow rate of a fluent solid material comprising:
    a generally horizontal cylindrical pipe;
    a movable transportation element in the pipe for transporting the material along the pipe;
    a plurality of distance sensors mounted in the pipe in an upper part of the pipe and arranged to detect a distance of the material in a lower part of the pipe from the distance sensor and to generate distance signals in response thereto;
    a control system for analyzing the distance signals from the distance sensors over time to provide the estimate of flow rate;
    and a vibration sensor mounted on the pipe responsive to vibrations in the pipe which provides an input to the control system.

22. The apparatus according to claim 21 wherein the distance sensors are located at different angles around axis of the pipe.

23. The apparatus according to claim 21 wherein the distance sensors are arranged at spaced positions along the pipe and are directed to detect said distance at spaced positions along the pipe.

24. The apparatus according to claim 21 wherein the distance sensors are arranged at spaced positions along the pipe and are directed to detect said distance at a common position in the pipe.

25. An apparatus for estimating a flow rate of a fluent solid material comprising:
    a generally horizontal cylindrical pipe;
    a movable transportation element in the pipe for transporting the material along the pipe;
    wherein the movable transportation element comprises a movable disc conveyor element in the pipe movable along the pipe for transporting the material along the pipe;
    a plurality of distance sensors mounted in the pipe in an upper part of the pipe and arranged to detect the distance of the material in a lower part of the pipe from the distance sensor and to generate distance signals in response thereto;
    and a control system for analyzing the distance signals from the distance sensors over time to provide the estimate of flow rate.

26. The apparatus according to claim 25 wherein the distance sensors are located at different angles around the axis of the pipe.

27. The apparatus according to claim 25 wherein the distance sensors are arranged at spaced positions along the pipe and are directed to detect said distance at spaced positions along the pipe.

28. The apparatus according to claim 25 wherein the distance sensors are arranged at spaced positions along the pipe and are directed to detect said distance at a common position in the pipe.

29. The apparatus according to claim 25 wherein a vibration sensor is mounted on the pipe responsive to vibrations in the pipe which provides an input to the control system.

30. The apparatus according to claim 25 wherein there is provided a rate detection sensor for detecting a rate of movement of the disc conveyor along the pipe and wherein the control system is arranged to use the rate of movement for analyzing the distance signals from the distance sensors over time to provide the estimate of flow rate.

* * * * *